Nov. 7, 1939.　　G. K. McKEE ET AL　　2,178,915
MACHINE TOOL
Filed Feb. 28, 1936　　8 Sheets-Sheet 1

INVENTORS
GEORGE K. McKEE
CHARLES E. BERNITT
BY
Ramsey and Ravo
ATTORNEYS.

Nov. 7, 1939.　　G. K. McKEE ET AL　　2,178,915
MACHINE TOOL
Filed Feb. 28, 1936　　8 Sheets-Sheet 2
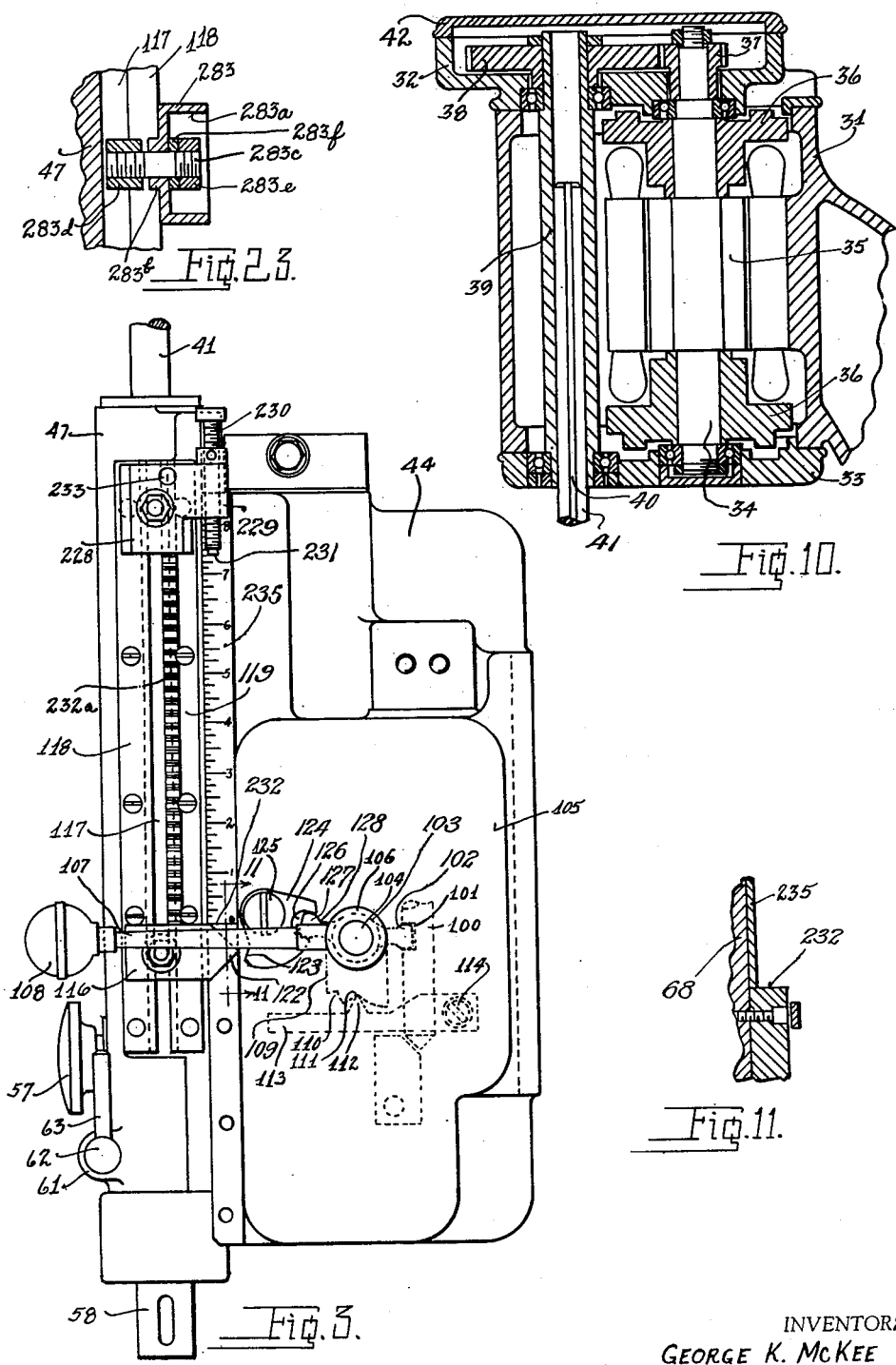
INVENTORS
GEORGE K. McKEE
CHARLES E. BERNITT
BY Ramsey & Ravi
ATTORNEYS Nov. 7, 1939.   G. K. McKEE ET AL   2,178,915
MACHINE TOOL
Filed Feb. 28, 1936   8 Sheets-Sheet 3
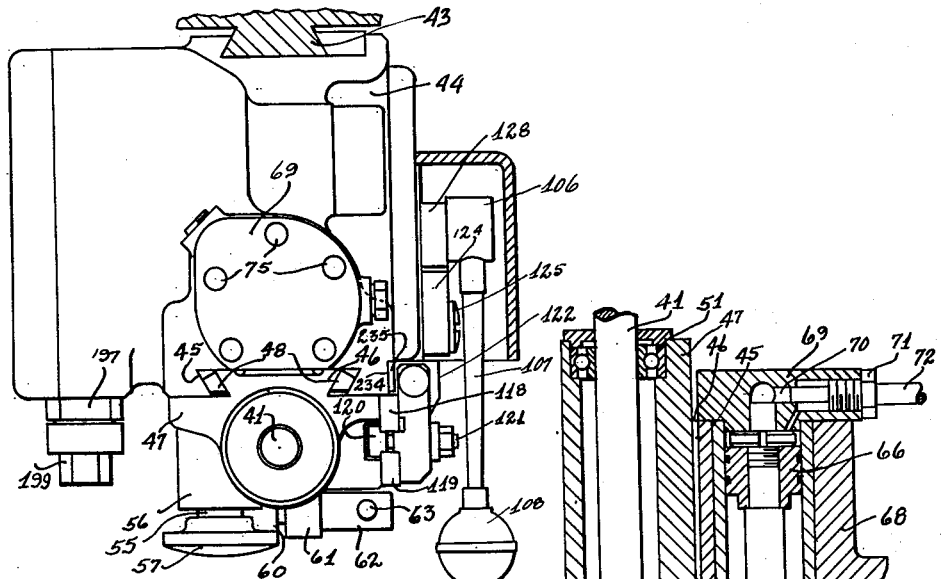
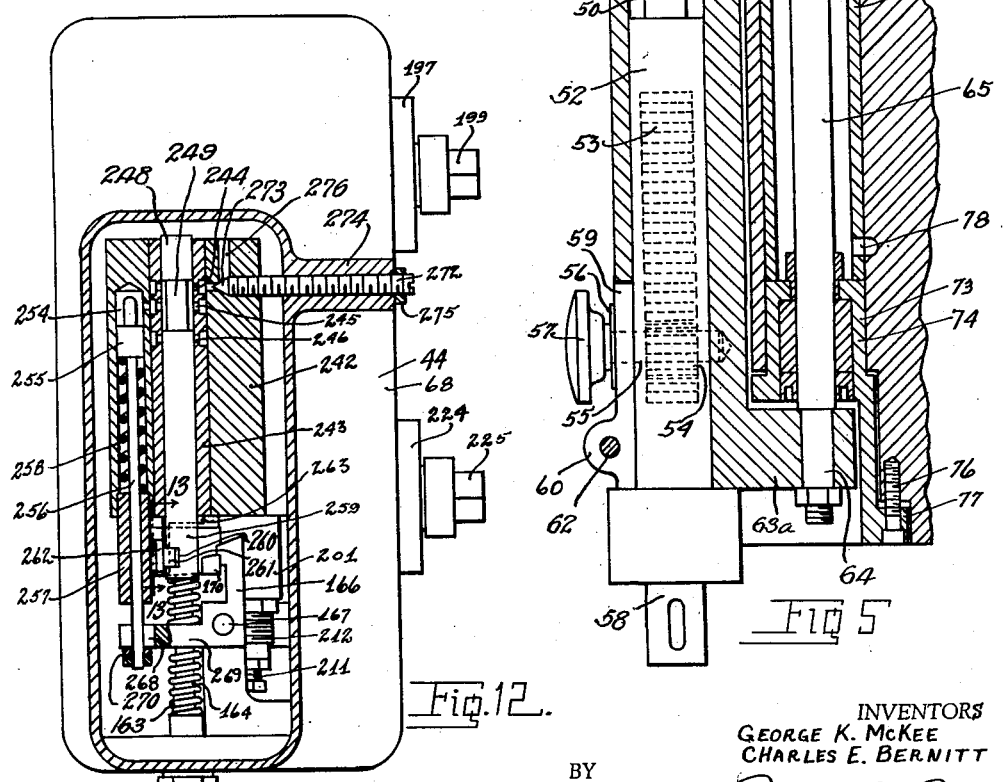
INVENTORS
GEORGE K. McKEE
CHARLES E. BERNITT
BY
Ramsey & Rave
ATTORNEYS

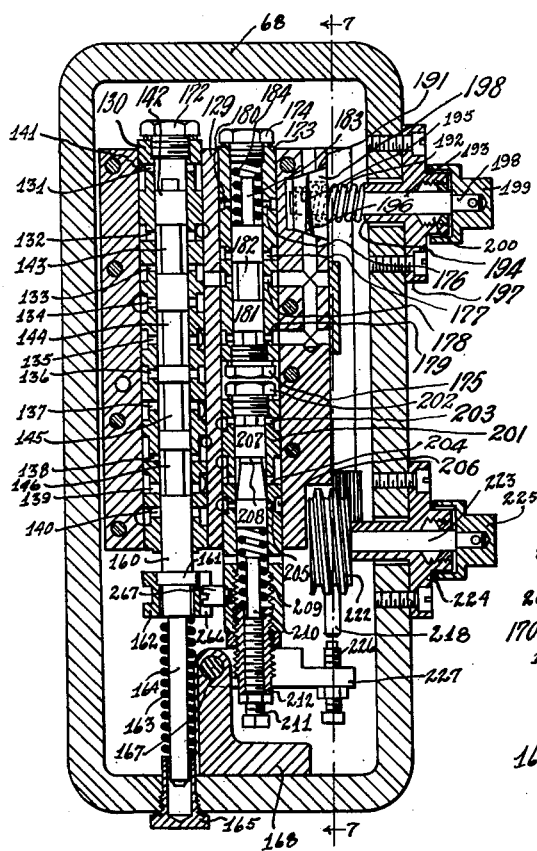
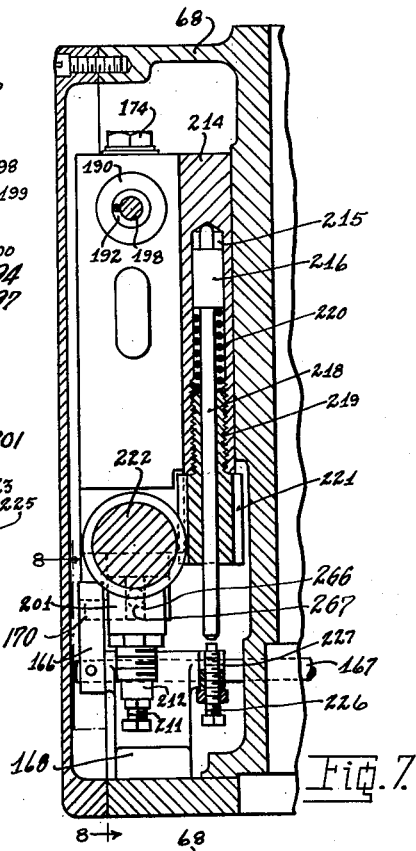
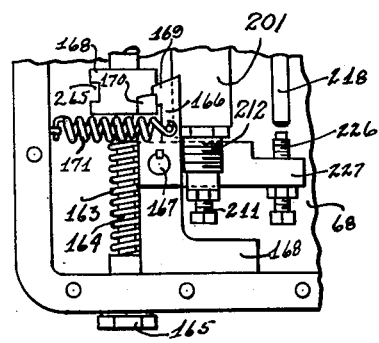
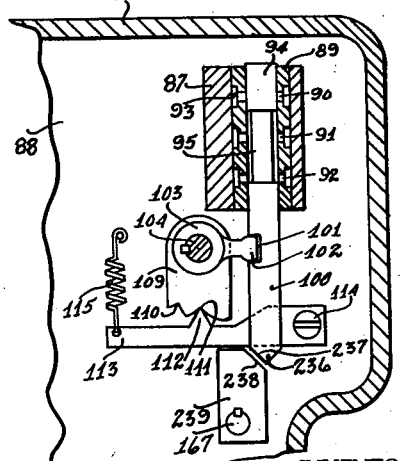

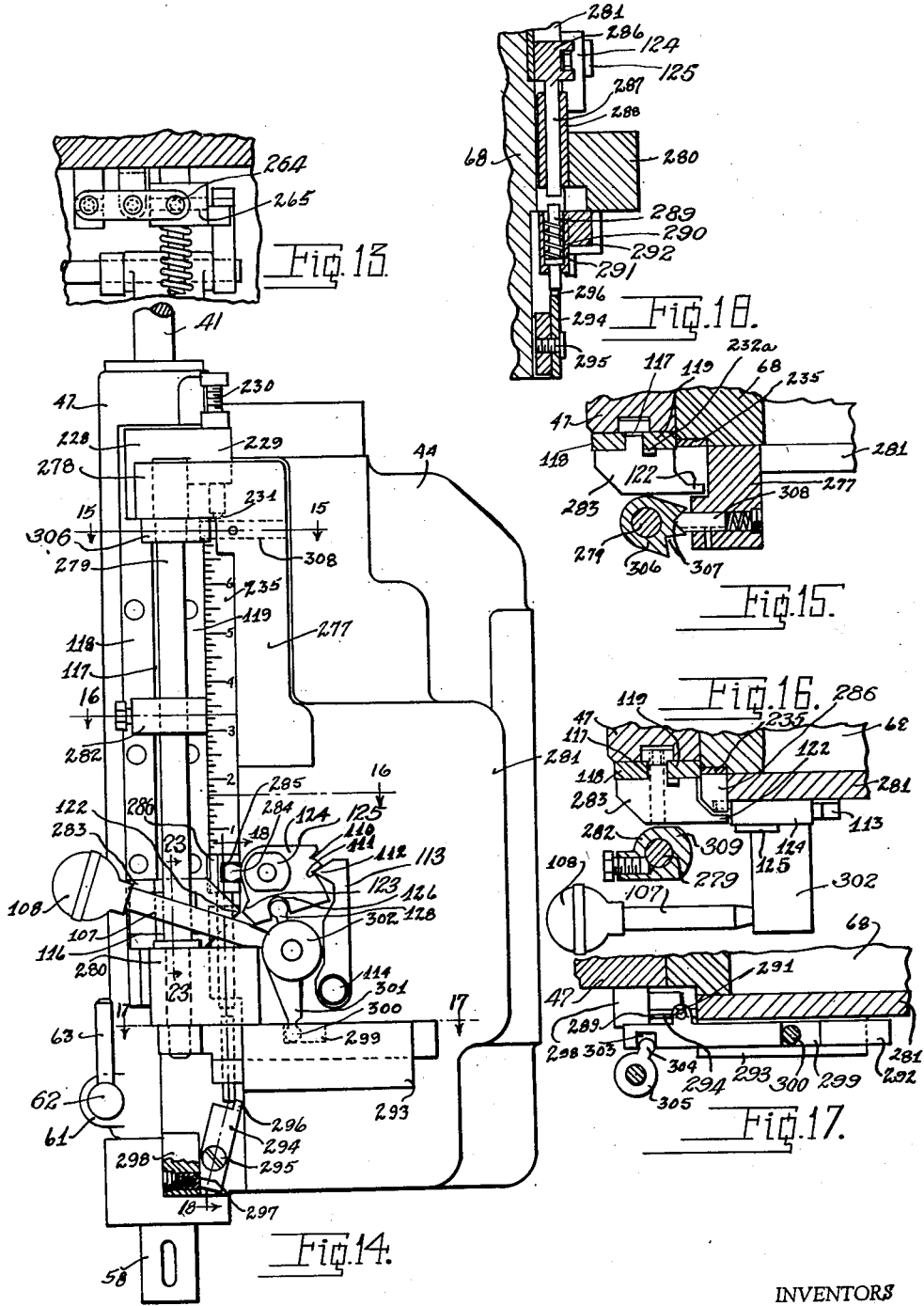

Nov. 7, 1939.    G. K. McKEE ET AL    2,178,915
MACHINE TOOL
Filed Feb. 28, 1936    8 Sheets-Sheet 6

INVENTORS
GEORGE K. McKEE
CHARLES E. BERNITT
BY Ramsey & Raw
ATTORNEYS.

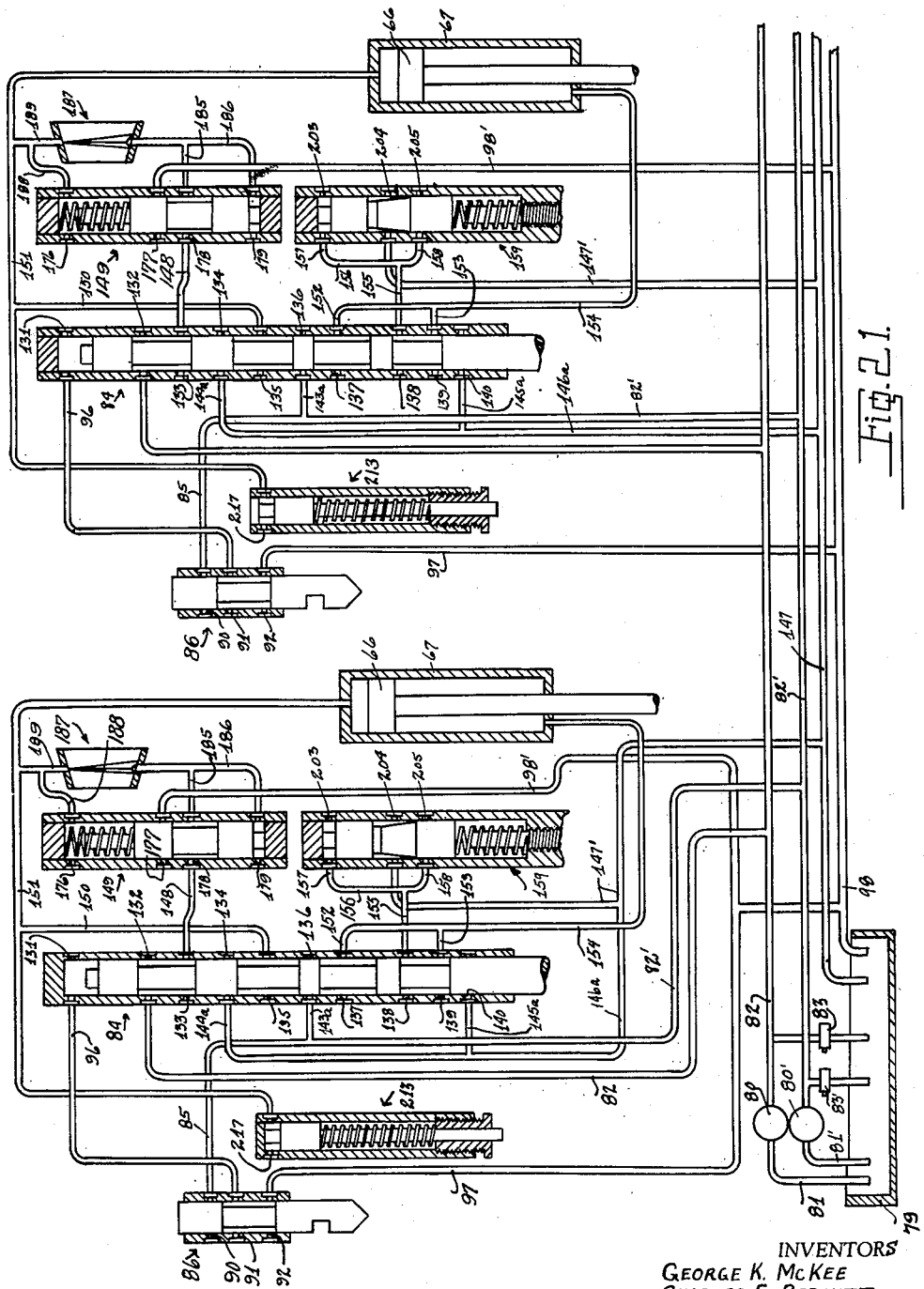

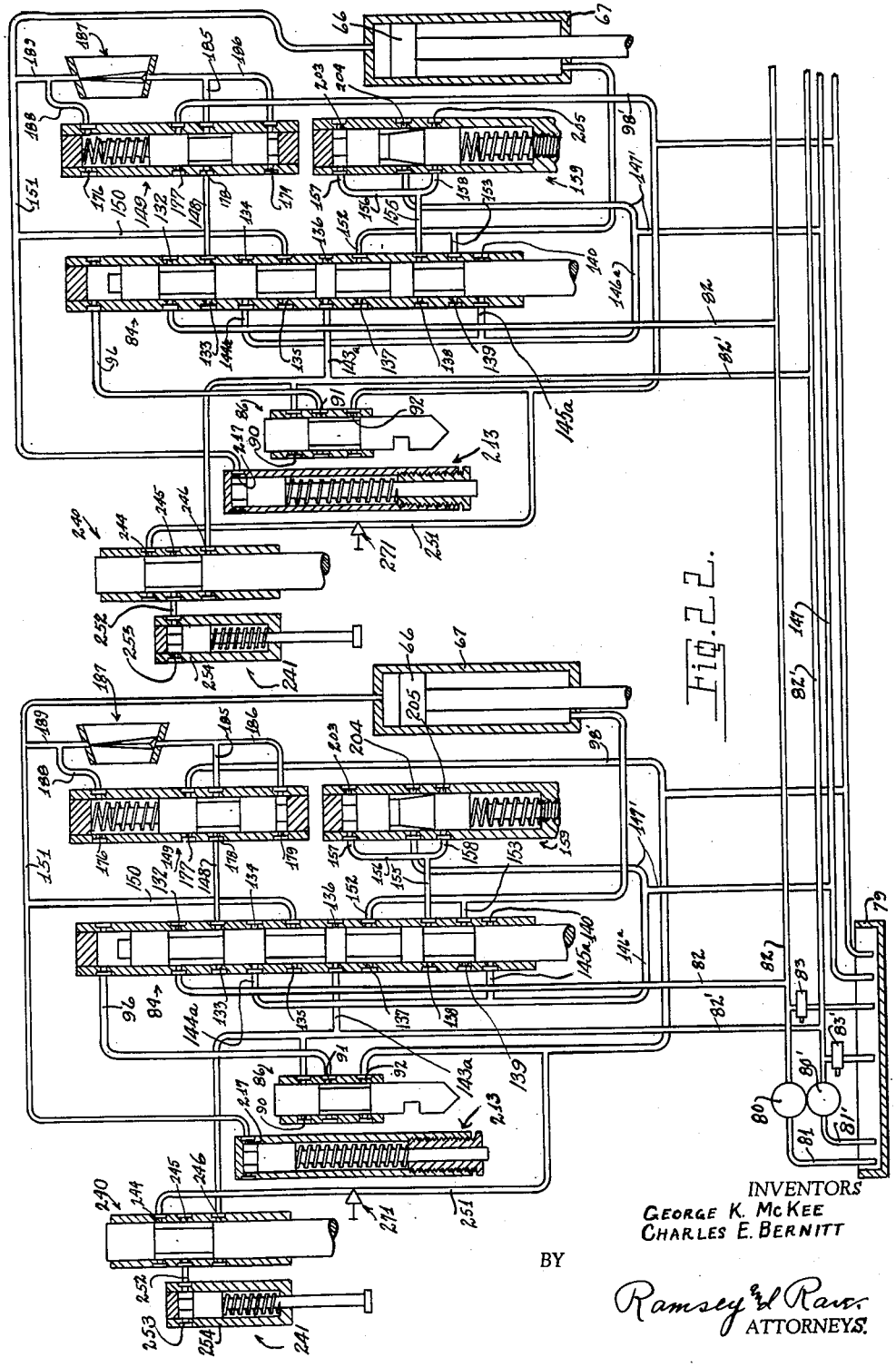

Patented Nov. 7, 1939

2,178,915

UNITED STATES PATENT OFFICE 2,178,915

MACHINE TOOL

George K. McKee and Charles E. Bernitt, Cincinnati, Ohio, assignors to The Avey Drilling Machine Company, Covington, Ky., a corporation of Ohio Application February 28, 1936, Serial No. 66,263

29 Claims. (Cl. 77—32)

This invention relates to improvements in machine tools and particularly to improvements in drilling machines.

One of the principal objects of the present invention is the provision of an improved control mechanism for controlling the movement of the tool in such machines.

Another object of the invention is the provision of an improved hydraulic control circuit for effecting and controlling the various movements of a tool or drill relative to a work-piece.

A further object of the invention is the provision of a machine tool or drilling machine particularly adapted for drilling long or deep holes and in which the tool or drill may be repeatedly actuated through and from the work during the tooling or drilling of said long or deep hole.

A still further object of the invention is the provision of a drilling machine having the drill thereof actuated through a series of steps while boring or drilling a relatively long or deep hole and taking advantage of the thrust set up during the drilling or cutting of the work to effect automatic clearing of the chips from the hole thereby materially increasing the life of a drill or tool and reducing the breakage thereof to a minimum.

A still further object of this invention is the provision of an improved hydraulic control circuit and mechanism therefor which will materially simplify the production of such a mechanism without sacrificing in the least the efficiency of such a circuit.

It is also an object of this invention to provide a multiple drilling machine in which the individual spindles or tool carriers of each drilling machine are hydraulically actuated independently of the other spindles and without effecting their operation.

Other objects and advantages of the present invention should be readily apparent by reference to the following specification considered in conjunction with the accompanying drawings forming a part thereof and it is to be understood that any modifications may be made in the exact structural details there shown and described, within the scope of the appended claims, without departing from or exceeding the spirit of the invention.

In the drawings:

Fig. 3 is an enlarged side elevational view of the drill head which encloses the hydraulic control and operating mechanism;

Fig. 4 is an enlarged top plan view of the head as seen from line 4—4 on Fig. 1;

Fig. 5 is an enlarged fragmentary sectional view through the head as seen from line 5—5 on Fig. 1;

Fig. 6 is an enlarged sectional view through the head and illustrating the control valves as seen particularly from line 6—6 on Fig. 1;

Fig. 7 is a sectional view taken at right angles to Fig. 6 and as seen from line 7—7 on said Fig. 6;

Fig. 8 is a fragmentary elevational view of certain parts of Fig. 7 as seen from line 8—8 on said Fig. 7;

Fig. 9 is a view partly in section and partly in elevation of the pilot valve and control mechanism therefor, said parts being further illustrated in dotted lines in Fig. 3;

Fig. 10 is an enlarged fragmentary sectional view through the drive mechanism for the spindle as seen from line 10—10 on Fig. 1;

Fig. 11 is a fragmentary sectional view of the final stop ledge as seen from line 11—11 on Fig. 3;

Fig. 12 is a sectional view taken in a plane ahead of Fig. 6 and illustrating the control mechanism for a stage drilling mechanism, that is, a mechanism for effecting step by step drilling through a long or deep hole;

Fig. 13 is a view partly in section and partly in elevation illustrating the connection between the stage drilling mechanism and the normal control mechanism;

Fig. 14 is a side elevational view of the drill head, similar to Fig. 3, illustrating the operating mechanism for the stage drilling machine;

Fig. 15 is a detail sectional view taken on line 15—15 on Fig. 14;

Fig. 16 is a detail sectional view taken on line 16—16 of Fig. 14;

Fig. 17 is a detail sectional view taken on line 17—17 of Fig. 14;

Fig. 18 is a vertical detail sectional view taken on line 18—18 of Fig. 14;

Fig. 21 is an hydraulic circuit diagrammatically illustrating a general purpose machine including a plurality of spindles here shown as two in number;

Fig. 22 is an hydraulic circuit diagrammatically illustrating a drilling machine having a plurality of spindles, here shown as two in number, to each of which spindles is coupled a stage drilling attachment; and Fig. 23 is a fragmentary sectional view through the slip dog mounting as seen from line 23—23 on Fig. 14.

Throughout the several views of the drawings similar reference characters are employed to denote the same or similar parts.

Figure 1:
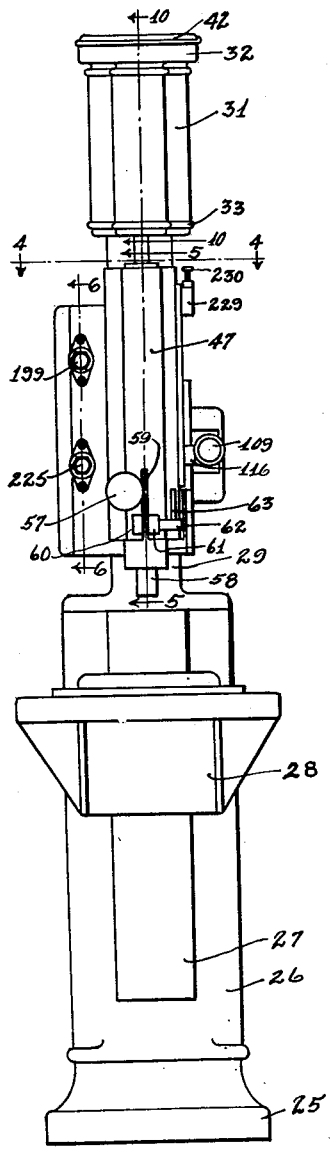
Fig. 1 is a front elevation of a drilling machine embodying the improvements of this invention.

In the drawings the structural elements are illustrated in the main in connection with a single spindle general purpose machine, but it is to be understood that the following description is to be interpreted as applied to a multiple spindle machine as illustrated diagrammatically in the hydraulic circuit drawings. While the stage drilling attachment is illustrated in connection with a single spindle machine in the structural views, it is to be understood that a multiple drilling machine, each spindle having a stage drilling attachment thereon, may be provided, in accordance with the diagrammatic hydraulic circuit.

Figure 2:
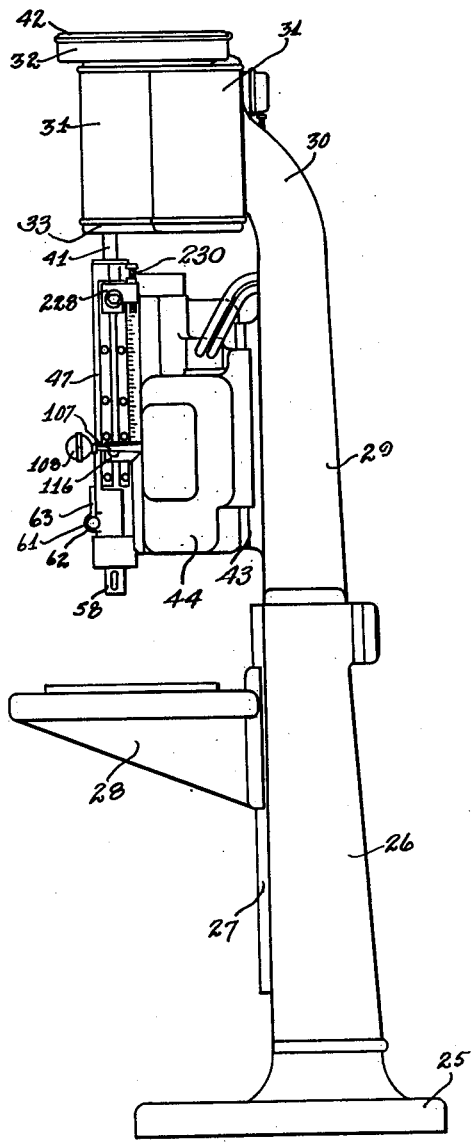
Fig. 2 is a side elevational view of the machine shown in Fig. 1.

As seen in Figs. 1 and 2, the drilling machine comprises a base 25 from which rises a standard 26 having formed along its forward face a V-shaped dovetail 27 for the work-supporting table 28. Any suitable or desirable means may be provided for adjusting the table 28 relative to the way 27 and for locking the table in adjusted positions.

Secured to the upper end of the standard 26 is a column 29 having a gooseneck 30 which has secured to it or integral therewith a housing 31 which overlies the table 28. The housing 31 encloses the motor and driving mechanism for rotating the spindle and these parts are shown in section in Fig. 10. As shown in this figure, the housing 31 is provided with an upper cap plate 32 and a lower cap plate 33 each providing anti-friction bearings for a shaft 34. The shaft 34 constitutes the motor shaft and has secured thereto an armature 35 and fan blades 36. The upper end of the shaft 34 projects into the cap plate 32 and has keyed or otherwise secured thereto a pinion 37 forming one member of a change gear transmission. Meshing with the pinion 37 is a gear 38 keyed or otherwise secured to a driving sleeve 39 rotatably mounted in anti-friction bearings carried by the upper and lower cap plates 32 and 33. The sleeve 39 has a spline connection 40 with the spindle 41 which, as will later be pointed out, carries a drill or the like at its other end. The upper cap plate 32 is closed by a suitable cover 42 which may be readily removed to permit replacement of the pinion 37 and gear 38 by other gears having a different ratio whereby the rate of rotation of the sleeve 39 and therefore the spindle 41 may be varied. By providing a variable speed motor 35 the said rate of rotation of these parts may be further varied.

Beneath the gooseneck 30 and on the forward face thereof the column 29 is further provided with a dovetail guideway 43 to which is secured the drill head indicated in general in Figs. 1 and 2 by the reference numeral 44. As seen in Fig. 4, the drill head is provided in its forward end with a V-shaped guideway 45 receiving a correspondingly shaped dovetail tongue 46 projecting rearwardly from the spindle carrier indicated in general in the several views of the drawings by the reference numeral 47. In order to take up any wear and insure accurate movement of the spindle carrier 47 there is provided between the dovetail guideway 45 and guide 46 gibs 48 which may be adjustable in the usual manner.

As seen in Fig. 5, the spindle carrier 47 comprises a housing 49 having formed therethrough a bore 50 receiving the spindle 41 therein. The spindle 41 is journaled in an anti-friction bearing 51 supported by the upper end of the housing 49 and is further journaled in a quill 52 which closely fits the bore 50 and is adapted to be vertically adjusted relative thereto. In order to effect the adjustment of the quill 52 and therefore the spindle 51, the said quill is provided on one side thereof with a rack or rack teeth 53 indicated in dotted lines in Fig. 5. Meshing with said rack or rack teeth 53 is a rack pinion 54 integral with or secured to a short shaft 55 rotatably journaled in a lug or boss 56 projecting from the housing 49. In order to rotate the pinion 54 and therefore the shaft 55 the said shaft projects beyond the boss 56 to receive a knob or the like 57. The lower end of the spindle 41 projects beyond the quill 52 and has formed at said projection a socket 58 receiving the tapered or fastening end of a drill tool or the like (not shown).

The quill 52 is adapted to be secured in its various positions of adjustment, and for this reason the housing 49 is split near its lower end as illustrated at 59. On each side of the split 59 the housing has projecting therefrom a pair of ears 60 and 61 in the former of which is provided a threaded perforation, while the latter has a plane perforation. Extending through the plane perforation and having threaded engagement with the threaded perforation is a clamping screw 62 having projecting therefrom a handle 63. The operation of this type of friction clamp is well known and needs no further explanation here.

In order to actuate the spindle carrier 47 relative to the head 44 the housing 49 of said carrier is provided with a projecting tongue or lug 63a having formed therein a perforation receiving the reduced end 64 of a piston rod 65. The piston rod 65 carries at its other end a piston 66 disposed within the bore of a cylinder 67 secured in any desirable manner in a suitable bore formed in the head housing 68. As shown in Fig. 5, the cylinder 67 is closed at its upper end by a head 69 in which is formed a port 70 communicating with a pipe coupling 71 for a pipe or conduit 72. The lower end of the cylinder 67 is likewise closed by a head 73 which carries with it a stuffing box or packing 74 to prevent leakage past the piston rod 65, since said piston rod must pass through the head 73. The upper cylinder head 69 is secured by means of a plurality of countersunk bolts 75 while the lower piston head is secured by one or more countersunk screws 76 passing through a flange 77 integral with and projecting from the head 73. In order to supply actuating fluid to the undersurface of the piston 66, to be described in detail later, the head housing 68 and cylinder 67 are provided with matching ports 78.

Figure 19:
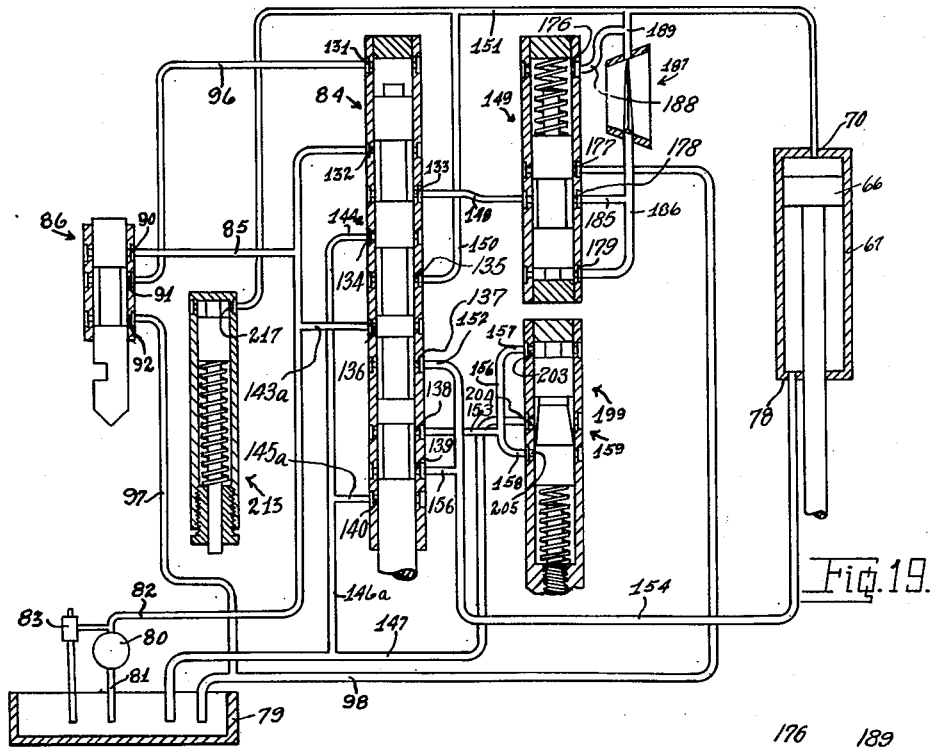
Fig. 19 is an hydraulic diagram illustrating the hydraulic circuit for a single spindle utility drilling machine.

The hydraulic circuit for controlling and supplying the actuating fluid to the ports 70 and 78 of the cylinder is shown in Fig. 19, and this circuit will now be described, and during the description of said circuit the several control valves will be described in detail with reference to their structural views as they are encountered in said circuit. As seen in Fig. 19, there is provided a sump or tank 79 which may be a part of the bed standard 26 or may be a separate tank disposed adjacent the machine base 25. Disposed above the said tank 79 is a pump 80 connected with the tank by means of a suction pipe 81. Projecting from the other side of the pump 80 is the pressure pipe or conduit 82 connected through a relief valve 83 with the tank 79. The valve 83 is adjustable to determine the operating pressure in the system and therefore the maximum pressure which will be developed in the system during the operation thereof. The pressure conduit 82 terminates at its other end in a control valve mechanism indicated in general in Fig. 19 by the reference character 84. The pressure pipe or conduit 82 in addition has extending therefrom a branch pipe or conduit 85 which terminates in a starting or pilot valve mechanism indicated in general in Fig. 19 by the reference numeral 86.

The starting valve mechanism is structurally illustrated in Fig. 9 and as there shown comprises a housing 87 secured in any desirable manner to an interior wall 88 of the head houing 68. The casing 87 is provided therethrough with a bore into which is secured a valve sleeve 89 which is provided with a plurality of sets of radial ports 90, 91 and 92. Each of these sets of radial ports is encircled by a similar circumferential groove 93 formed in the exterior of the valve sleeve 89.

Disposed within the bore in the valve sleeve 89 is a valve member 94 provided intermediate its ends with a reduced portion or cannelure 95 adapted in different positions of adjustment to connect the central set of radial ports 91 with the end sets of radial ports 90 and 92. The valve member 94 therefore has two positions of adjustment, that shown in the drawings and a second position above that shown, or for connecting the ports 91 and 90. As seeen in Fig. 19, it is with the ports 90 that the branch pressure pipe or conduit 85 connects, while the ports 91 have connected therewith one end of a pipe or conduit 96 which terminates at its other end in the valve mechanism 84. The remaining set of ports 92 have connected therewith one end of a pipe or conduit 97 which has its other end connected with, as shown in Fig. 19, a pipe or conduit 98 which terminates or discharges in the sump or tank 79. It should be noted here that the pipe or conduit 98 is merely a drain from the interior of the head housing 68 and that the pipe or conduit 97 instead of being connected with a return drain or pipe merely empties into the interior of the housing itself from which the fluid is drained off.

In order to shift or actuate the valve member 94 it has projecting therefrom a stem 100 being provided in one side thereof with a notch 101 receiving the ball end 102 of a valve shifter member 103. This valve shifter member 103 is keyed or otherwise secured to a stud or shaft 104 rotatably journaled in a plate member 105 secured to the righthand surface of the head housing 68. Exteriorly of the said plate member 105 the shaft or stud 104 has secured to it the hub 106 of the manual starting and stopping lever 107 which terminates at its outer end in a knob or ball 108. By reference to Figs. 3 and 9 it will be seen that if the lever 107 is actuated downwardly or in a counter-clockwise direction it will effect an elevation of the valve member 94 and thereby connection through the reduced portion or cannelure thereof the ports 90 and 91.

In order to determine the positions of the valve member 94 the stud or shaft 104 has keyed or otherwise secured thereto behind the plate member 105 a detent member 109 having formed in its operative periphery, notches 110 and 111. Cooperating with said notches 110 and 111 is the pointed nose 112 of a dog 113 pivoted at 114 to the housing wall 88. In order to hold the operative end of the detent plate 109 and dog nose 112 into engagement with one another the said dog 113 is yieldably actuated through the spring 115 toward the shaft 104. As will be noted from Fig. 9, the sides of the notches 110 and 111 are arcuately cam shaped and therefore these parts act as the load and fire dog for firing the valve shifting member 103 past center to its operative positions.

In the operation of the machine the valve member is manually operated to its second position, or that not shown in the drawings, and it should be noted that this position is the starting position. In order to shift the valve to the position shown use is made of a dog 116 adjustably secured in a slot 117 formed in the side of the spindle carrier 49. As seen in Fig. 4, the slot 117 is formed by milling a groove along one side of the spindle carrier and securing to the said side of the spindle carrier adjacent the groove 117 a pair of bearings 118 and 119. The inner adjacent edges of the bearings 118 and 119 slightly overlie the groove in the side of the carrier to thereby provide a T-shaped slot in which the head 120 of a clamping screw 121 is seated. The clamping screw 121 passes through a bore in the dog 116 and receives exteriorly thereof a nut for securing the dog in adjusted positions.

The dog 116 has its inner end tapered as at 122 in Fig. 3 for engagement with a shoulder 123 of a flipper 124 pivoted at 125 to the outer surface of plate member 105. The flipper 124 is provided with a notch 126 receiving the ball end 127 of an arm 128 keyed or otherwise secured to the stud or shaft 104.

Shifting of the valve member 94 to its second position, as above described, throws the shoulder 123 of the flipper 124 into the path of movement of the dog nose 122 so that said dog nose at the proper point in the movement of the spindle carrier will shift the said valve member from its starting position to its running position, that illustrated. It should be noted that the shifting of the valve to the running position by the dog 116 changes the rate of movement of the spindle carrier from rapid traverse to feeding.

The control valve mechanism 84 is structurally illustrated in Fig. 6 and as there shown comprises a valve block or housing 129 secured to an inner wall of head housing 68. The valve block 129 is provided with a bore in which is disposed a valve sleeve 130 being provided with a plurality of sets of radial ports 131, 132, 133, 134, 135, 136, 137, 138, 139, and 140, each set of ports being encircled by a similar circumferential groove 141 formed in the exterior of the sleeve 130. Disposed within the bore in the valve sleeve 130 is a valve member 142 being substantially cylindrical in form and having a plurality of reduced portions or cannelures 143, 144, 145, and 146 therein for connecting the sets of radial ports in different combinations depending upon the position of the said valve member.

As seen in Fig. 19, it is with the ports 131 that the pipe or conduit 96, from the valve mechanism 86, connects, while the ports 132 have connected therewith the terminus of the pressure pipe or conduit 82 and the ports 136 have connected therewith a second branch pressure pipe or conduit 143a. The radial ports 134 and 140 have respectively connected therewith discharge pipes or conduits 144a and 145a which empty into the branch discharge pipe or conduit 146a in turn emptying into discharge pipe or conduit 147 terminating in the sump or tank 79. The ports 133 have connected therewith one end of a pipe or conduit 148 the other end of which is connected with a balance valve mechanism indicated in general in Fig. 19 by the reference numeral 149. The ports 135 have connected therewith one end of a pipe or conduit 150 which empties into a pipe or conduit 151. The ports 137 and 139 have respectively connected therewith branch pipes or conduits 152 and 153 having their other ends connected with a pipe or conduit 154 which terminates at the lower end of the piston cylinder 67 and therefore connect with the port 78 thereof. The remaining ports 138 have connected therewith one end of a pipe or conduit 155 emptying into a pipe 156 which through its branches 157 and 158 is connected with a back pressure valve indicated in general in Fig. 19 by the reference numeral 159.

In order to connect the various ports of the control valve mechanism in different combinations the valve member 142 thereof has three operative positions, one of which is illustrated in the drawings; the second position being above that shown and the third position being below that shown. The initial operation of the starting valve member 94 through the lever 107, as above described, connects the pressure in the pipe or conduit 82 through the pipe or conduit 85, valve mechanism 86, and pipe or conduit 96 to the upper end of the control valve member 142 for driving same to its lowermost position which, as will be described later, effects a rapid downward movement of the piston 66 and therefore the spindle carrier. Upon engagement of the rapid traverse dog 116 of the spindle carrier with the flipper 124 the valve member 142 is shifted to the position shown, which is the feed position. In order to so shift the said valve it has projecting therefrom a valve stem 160 having a shoulder 161 thereon for a guide member 162. The guide member 162 has abutting its undersurface one end of a spring 163 which encircles a projecting reduced portion 164 of said stem. The other end of the spring 163 abuts a bushing, sleeve, or the like 165, threaded into the lower wall of the head housing 68. The movement of the valve member 142 by the spring 163 is limited by a latch 166 secured to one end of a shaft 167 rotatably journaled in a bracket 168 disposed interiorly of the housing 68. The latch 166 has projecting therefrom a hook or nose 169 engaging a lug 170 projecting laterally from the guide member 162. The latch 166 is later retracted to permit the spring 163 to shift the valve member 142 to its third or final position, which is the rapid retracting position. In order to hold the latch 166 in operative position to engage the lug 170 the said latch has connected therewith one end of a spring 171 which has its other end connected to a fixed part of the head housing. The upper position of the valve member 142 as effected by the spring 163 is determined by a plug 172 threaded into the upper end of the valve sleeve 130.

The balance valve mechanism 149 is shown structurally in Fig. 6, and as there shown comprises a valve sleeve 173 pressed into a suitable bore in the valve block 129 and having the opposite ends of the bore therein closed by plugs 174 and 175. The sleeve 173 is provided therethrough with a plurality of sets of radial ports 176, 177, 178, and 179, each set being encircled by a similar circumferential groove 180. Disposed within the bore in the sleeve 173 is a cylinder piston type valve member 181 having intermediate its ends a reduced portion or cannelure 182 adapted to connect the ports 178 and 177 to more or less restrict the flow relative thereto to control the rate of actuation of the piston 66 as will be explained in further detail later. The valve member 181 has projecting from one end thereof an elongated stem 183 which is encircled by a spring 184 abutting on one end with the plug 174 and on the other end with the shoulder of the valve member around the stem 183.

By reference to Fig. 19 it will be seen that it is with the ports 178 that the pipe or conduit 148 connects, while with the same ports but on the other side of the valve the said ports are connected through a branch conduit 185 with a conduit 186 terminating on its upper end in an adjustable throttle valve mechanism indicated in general by the reference numeral 187. The pipe or conduit 186 in addition is connected with the ports 179. The ports 176 have connected therewith one end of a pipe or conduit 188 which terminates at its other end in a pipe or conduit 189 extending between the adjustable throttle valve mechanism 187 and the pipe or conduit 151. The remaining ports 177 have connected therewith the upper end of the discharge pipe or conduit 98. The operation of the balance valve mechanism 149 is well understood, since it is utilized for maintaining a constant pressure in the circuit as effected and determined by the throttle valve mechanism 187.

This throttle valve mechanism 187 is shown structurally in Fig. 6 and comprises a conical valve member 190 disposed in a correspondingly conically shaped seat 191 formed in the side of the valve block 129. The valve member 190 is provided with a counter bore in which is disposed one end of a spring 192 which encircles a valve stem 193 and abuts on one end the base of said counter bore and on the other end with a shoulder 194 formed on the stem 193. The inner end of the stem 193 has a sliding key and slot connection 195 with the valve member 190 whereby the rotation of the shaft or stem 193 effects the rotation of the valve member 190. The body portion of the valve member 190 is provided throughout a portion of its periphery with a groove or slot 196 which gradually decreases in depth and width from the starting point to the finishing point of said groove. This groove is adapted to have its position changed with respect to the pipes or conduits 186 and 189 (see Fig. 19) for thereby enlarging or decreasing the orifice through which the flow takes place from one of these pipes or conduits to the other and thereby controls the amount of fluid to the piston 66 and thereby controlling the rate of actuation of said piston.

As seen in Fig. 6, the valve stem or spindle 193 is rotatably journaled in a bracket or carrier 197 and has projecting from said bracket a reduced portion 198 to which is keyed or otherwise secured a knob, actuating member, or the like 199. It should be noted that at the point where the stem 193 leaves the carrier 197 the said carrier is provided with a stuffing box 200 to prevent loss of fluid along the said stem. The carrier 197 and parts supported thereby are disposed on the outer surface of the forward wall of the head housing 68 whereby the rate of feed of the piston and therefore of the spindle carrier may be readily adjusted from the outside of the machine.

The back-pressure valve mechanism 159 is substantially identical in construction with the balance valve mechanism 149 except that it operates in a reverse direction and for an opposite purpose to that of the balance valve 149. This back-pressure valve mechanism is illustrated structurally in Fig. 6 and as there shown comprises a valve sleeve 201 pressed into a suitable bore formed in the valve block 129 and having one end of the bore in said sleeve closed by a screw plug or the like 202. The sleeve 201 is provided with a plurality of sets of radial ports 203, 204, and 205, each set being encircled by a similar circumferential groove 206 formed in the exterior of the sleeve 201. Disposed within the bore in the valve sleeve is a valve member 207 having intermediate its ends a reduced portion or cannelure 208 adapted to control the rate of flow through the port 205 which, as will later be made clear, is the rate of flow from the discharge end of the cylinder during a tooling or cutting stroke of the tool carrier.

As seen in Fig. 19, the ports 203 and 205 have respectively connected therewith the branch discharge pipes or conduits 157 and 158 which through pipes or conduits 156, and 155, connect with the control valve mechanism 84, while ports 204 have connected therewith the discharge pipe or conduit 147. In order to normally control the position of the valve member 207 it has abutting one end thereof a spring 209 which encircles a stem 210 projecting from an adjustable screw 211 threaded into a bushing 212 in turn threaded into the lower end of the valve sleeve 201. By providing the adjustable sleeve 212, which forms the other abutment for the spring 209, and the adjustable screw 211, the tension and position of the said spring 209 may be varied. Each of these parts is adapted to be secured or locked in adjustable positions by suitable lock nuts threaded thereon.

Referring now to Fig. 19, it will be noted that the pipe or conduit 151 extending from the upper end of the cylinder 67, from which extend branch pipes or conduits 189 and 150, terminates in an overload piston-valve mechanism indicated in general in Fig. 19 by the reference character 213. This overload mechanism is illustrated structurally in Fig. 7 and comprises a block 214 in which is provided a bore 215 which forms a cylinder for piston member 216. The block 214, see Fig. 19, is provided therethrough with a port 217 with which the end of the pipe or conduit 151 connects. The piston 216 has projecting from its lower end a rod 218 passing through the bore in a sleeve 219 threaded into the block 214 at the lower end of the bore therein. Surrounding the piston rod 218 is a spring 220 abutting on its upper end with the piston 216 and on its lower end with the sleeve 219. Below the block 214 the sleeve 219 is provided with a spur tooth pinion 221 meshing with the teeth of a worm 222. The worm 222 is integral with or secured to a shaft 223 rotatably journaled in a carrier 224 which is similar to the carrier 197 and is secured to the outer surface of the head housing 68. The shaft 223 has pinned or otherwise secured thereto a knob 225 whereby the worm may be adjusted for rotating the sleeve 219 and thereby varying the tension placed on the spring 220.

This overload mechanism is adapted to effect the reversal of the valve control mechanism at the end of the tooling or drilling operation as will be more clearly pointed out later. To effect this operation the piston rod 218 overlies a screw 226, see Figs. 6, 7, and 8, carried by a lever 227 keyed or otherwise secured to the shaft 167 and disposed on the opposite side of the bracket 168 from that on which the latch 166 is disposed. In other words, the downward movement of the piston 216 through its rod 218 and lever 227, shaft 167, and latch 166 removes the latch from the lug 170 thereby permitting the spring 163 to shift the control valve 142 to its upper position.

In order to overload the mechanism 213 the tool carrier is provided with a dog which limits the movement of the said carrier. As shown in Fig. 3, this dog is indicated by the reference numeral 228 having projecting therefrom a cylindrical lug 229 in which is threadedly disposed the dog screw 230. The dog screw 230 is adapted to have its lower end 231 engage with a ledge or shoulder 232 integral with and projecting from the head housing 68 as seen in Fig. 11. To secure the dog 228 in position and hold same against movement when the main actuating piston 66 is overloaded, the carrier is provided adjacent the slot 117 with a plurality of spaced rack teeth 232a engaging a hardened pawl 233 projecting rearwardly from the dog 228.

The operation of the mechanism thus far described is as follows:

The pump 80 is started to provide pressure in the pressure pipe or conduit 82 as determined by the relief valve 83. At this time the starting valve member 94 is in the position shown in the drawings with the control valve member 142 in its uppermost position thereby connecting the pressure pipe or conduit 82 through its branch pressure pipe or conduit 143a, control valve mechanism 84, and pipes or conduits 152 and 154, with the cylinder 67 for raising and holding the piston 66 in its uppermost position. The medium above the piston 66 is discharged through the pipes or conduits 151 and 150, control valve mechanism 84, and pipes or conduits 144a, 146a, and 147 to the sump or tank 79.

The lever 107 through its knob 108 is now actuated downwardly from the position shown in Fig. 3, thereby elevating or raising the starting valve member 94 to connect the ports 91 and 90 of the starting valve mechanism 96. At this time the pressure in the pipe or conduit 82 is connected through its branch pressure pipe or conduit 85, starting valve mechanism 86, and pipe or conduit 96 with the upper end of the control valve member 142 for actuating same downwardly to its lowermost position against the yielding resistance of spring 163 and loading said spring. This position of the valve member 142 now connects the pressure in the pipe or conduit 82 through its branch pipe or conduit 143a, valve mechanism 84, and pipes or conduits 150 and 151 with the upper end of the cylinder 67 for actuating the piston 66 at a rapid rate in a downward direction or toward the work to be tooled or operated upon. This rapid movement of the parts continues until interrupted by the rapid traverse dog 116 which engages and actuates the flipper 124 for shifting the starting valve member 94 to the position illustrated in the drawings.

At this time the starting valve member 94 connects the ports 91 with 92 and cuts off the pressure through the branch pressure conduit 85 from the conduit 96. By this arrangement the upper end of the control valve member 142 is now connected through the pipe or conduit 96, starting valve mechanism 86, and pipes or conduits 97 and 99 with the sump or tank 79. In other words, the pressure on the upper end of the control valve member 142 is now relieved thereby permitting the spring 163 to shift the said control valve member 142 upwardly. This movement of the valve member is arrested by the engagement of the lug 170 with the nose 169 of the latch 166 thereby positioning the valve member as shown in the drawings.

At this time the pressure in the pipe or conduit 82 is connected through the control valve mechanism 84 with the pipe or conduit 148, balance valve mechanism 149, pipes or conduits 185 and 186, throttle valve mechanism 187, and pipes or conduits 189 and 151 with the cylinder 67 for actuating the piston 66 at a relatively slow or feeding rate through the work. The other end of the cylinder 66 is now connected through the pipes or conduits 154 and 153, control valve mechanism 84, pipes or conduits 155, 156, 157, and 158, back-pressure valve mechanism 159, and pipe or conduit 147 with the sump or tank 79. Due to the construction of the balance valve mechanism 149 and back-pressure valve mechanism 159 the said piston 66 is actuated at a continuous rate depending upon the adjustment of the throttle valve mechanism 187, which rate is continued until the work is completely tooled or drilled.

At the conclusion of the tooling or drilling operation the dog screw 230 engages the ledge 232 thereby arresting any further movement of the tool carrier relative to the head. This means, of course, that the flow of hydraulic fluid through the system to the upper side of the piston 66 is stopped and this causes a backing up of the pressure through the pipe or conduit 151 to the overload mechanism 213. This backing up or building up of pressure in the overload cylinder 215 eventually actuates the piston 216 therein downwardly against the yielding resistance of the spring 220 and causes the piston rod 218 to engage the screw 226 and actuate the lever 227, shaft 167, and latch 166 in a clockwise direction and release the lug 170. As soon as this occurs the spring 163 shifts the control valve member 142 to its uppermost position thereby, through the connections above described, connects the pump 80 with the under side of the piston 66 for elevating same and the parts carried thereby.

From the foregoing it will now be appreciated that there has been provided an hydraulic control mechanism for effecting a rapid advance of the tool to the work, a slow movement of the tool through the work at a feeding rate, and a rapid retraction of the tool from the work. It should also be noted that the overload mechanism 213 effects a dwell in the movement of tool between the feeding thereof and the retraction, which dwell may be utilized for cleaning up the face of bosses or the like around a hole, or for any other purposes for which a dwell is useful. This dwell is, of course, adjustable through the mechanism by varying the tension on the overload mechanism spring 220 and as will be later pointed out is utilized to relieve the overload thrust on drills during a drilling operation.

In order to permit a ready setting up of the machine the head housing 68, see Figs. 3 and 4, is provided adjacent the dog slot 117 with a depressed seat 234 in which is set a scale 235 graduated in accordance with the unit of measure and utilized for the initial setting of the parts in accordance with the amount of rapid traverse to be had prior to the actual tooling operation and the amount of drilling or tooling actually to be accomplished.

It may at times be necessary or desirable to reverse the direction of movement of the tool and tool carrier without waiting for the completion of the tooling or cutting stroke. This may be effected manually through the handle or lever 107 by actuating same in a direction opposite to that in which it is moved for initially starting the movement of the parts. For this purpose the starting valve member stem 100 is provided at its lower end with a point 236 thereby providing an inclined or cam surface 237 which normally overlies and is spaced from a corresponding cam face 238 formed on a block 239 keyed or otherwise secured to the farthest end of the shaft 167. By reference to Figs. 6 to 9 inclusive it will be noted that if the starting valve member 94 were actuated downwardly, through the lever 107 as above described, the cam face 237 would engage with the cam face 238 and actuate the block 239 in a counterclockwise direction thereby correspondingly oscillating or rocking the shaft 167 which will oscillate the latch 166 in a clockwise direction to free the lug 170 and permit the spring 163 to shift the control valve member 142 to the position for retracting the tool carrier. From this it will therefore be seen that the movement of the tool carrier may be initiated by manual means in each direction.

The foregoing description deals with a mechanism that may be termed a general purpose drilling machine in which work-pieces having relatively shallow holes are operated upon. If it is desired to drill comparatively deep holes, or relatively thick work-pieces, such as the oil holes in crank shafts and the like, it is desirable and even necessary to periodically withdraw the drill from the hole to permit a clearing of the previously formed chips and the like. In order to effect this operation automatically with the machine above described it is only necessary to supply a couple of additional valves, and coupling mechanism, to connect the said valves with certain of the valves above described. These additional valves are illustrated diagrammatically in Fig. 20 to which reference is now to be had.

Figure 20:
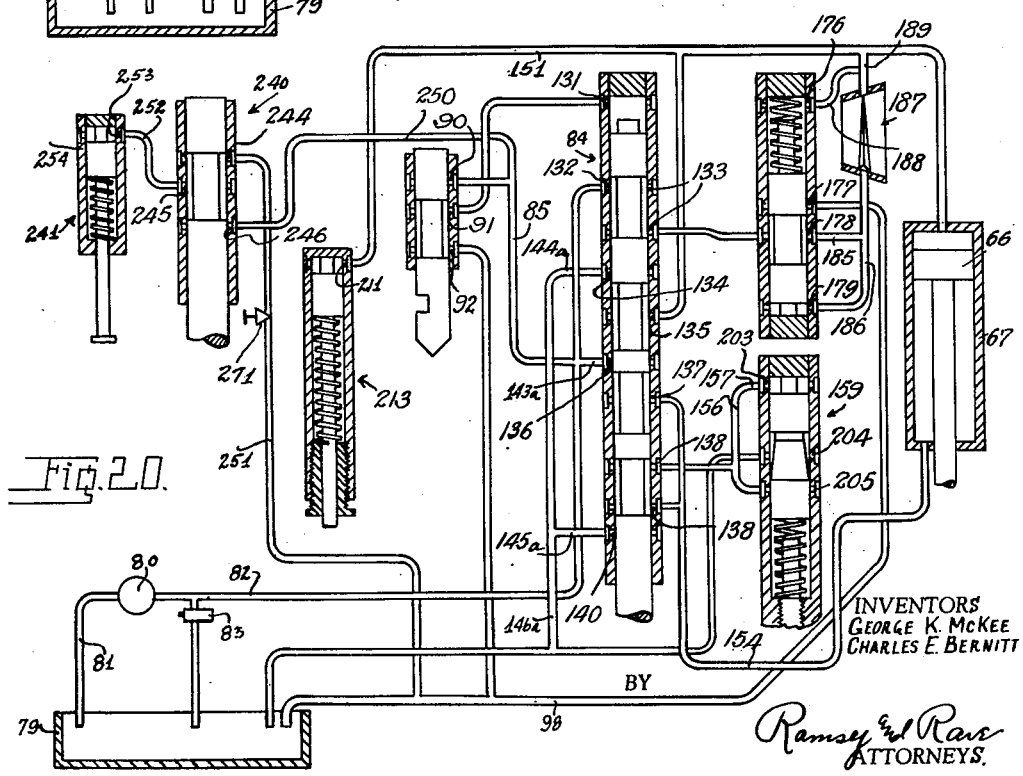
Fig. 20 is an hydraulic circuit diagrammatically illustrating the control mechanism for a single spindle drilling machine with the stage drilling attachment coupled thereto.

As seen in Fig. 20, there is provided a valve mechanism indicated in general by the reference character 240 which may be termed a control valve for the timing mechanism indicated in general by the reference character 241. The timing mechanism control valve 240 is somewhat similar in construction to the starting valve mechanism 86 and is illustrated structurally in Fig. 12 and comprises a valve block 242 secured to the outer side of the valve block 129. Pressed into a suitable bore in the valve block 242 is a valve sleeve 243 having formed therethrough a plurality of sets of radial ports 244, 245, and 246, each set of ports being encircled by a similar groove formed in the exterior of the sleeve 243. Disposed within the bore in the valve sleeve 243 is a valve member 248 having formed intermediate its ends a reduced portion or cannelure 249 adapted, when in one position, to connect the ports 245 and 244, and, when in a second position, to connect the ports 245 and 246.

As seen in Fig. 20, the ports 246 have connected therewith one end of a pipe or conduit 250 which is an extension or branch of the main pressure pipe or conduit 82. The ports 244 have connected therewith one end of a pipe or conduit 251 which terminates in the pipe or conduit 98 and thereby the sump or tank 79. The remaining ports 245 have connected therewith one end of a pipe or conduit 252 which terminates at a port 253 formed through the wall of the timing mechanism cylinder 254.

The timing mechanism 241 is structurally illustrated in Fig. 12 and as there shown comprises a bore formed in the valve block 242 and constituting the cylinder 254. Disposed within this cylinder 254 is a piston 255 from which projects a piston rod 256. The rod 256 passes through a guide sleeve 257 secured in the lower end of the cylinder 254. Encircling the piston rod 256 and disposed within the cylinder 254 is a spring 258 having its one end in abutment with the undersurface of the piston 255 and its other end in abutment with the guide sleeve 257.

In order to actuate the valve member 248 to its several operative positions the said valve member has projecting therefrom a valve stem 259 in which is formed a notch 260 receiving a lug 261 projecting from one end of a lever 262. The lever 262 is pivoted intermediate its ends to a bracket 263 secured to the undersurface of the valve block 242. Projecting from the other end of the lever 262 is a lug 264 received in a notch 265 provided in one side of the member 162 carried by the control valve stem 160. From the foregoing it will be noted that the control valve member 248 for the timing mechanism and the control valve member 142 for the piston 66 are connected to one another whereby the movement of one of said members in one direction effects the movement of the other member in the opposite direction. In order to maintain the guide member and spring abutment 162 in proper position on the valve stem 160 the said member is provided on its side opposite from the notch 265 with a vertical guideway 266 receiving the guiding head 267 of a screw mounted in the valve sleeve 201.

The timing piston rod 256, see Fig. 12, passes through the forked end 268 of a lever 269 integral with or secured to and projecting from the valve latch 166, and the said piston rod 256 is provided below the arm 269 with a pair of lock nuts 270 whereby the upward movement of the piston 255 and its rod 256 actuate the latch 166 to release the main piston control valve member 142 for the purpose which will now be described.

From the foregoing description it will be noted that the upward movement of the main piston control valve 142 moves the time mechansim control valve member 248 downwardly thereby connecting the pressure in the pipe or conduit 82 through the pipe or conduit 250, valve mechanism 240, and pipe or conduit 252 with the time cylinder 254 for downwardly actuating the timing piston 255 therein. This takes place during the rapid movement of the carrier toward the work-piece, which movement is, of course, arrested or stopped by the rapid traverse dog shifting the starting valve mechanism and thereby permitting the main piston control valve member 142 to assume the position illustrated in the drawings. The movement of this control valve member to this position through the arm 262 and parts associated therewith shifts the time mechanism control valve member 248 to the position shown, thereby connecting the time cylinder 254 through the pipe or conduit 252, valve mechanism 240, and pipes or conduits 251 and 98 with the sump or tank 79, thereby permitting the upward movement of the time piston 255. During the upward movement of the piston 255 it carries with it the piston rod 256 and lock nuts 270 which near the end of the stroke of the time piston engage the lever 269 for actuating the latch 166 to a valve-releasing position, thereby permitting the spring 163 to shift the main piston control valve 142 to its rapid retracting position. This takes place after a definite time interval, which time interval, of course, is adjustable to permit the drill or tool to operate partway through a work-piece. As will later be described, the parts are automatically reversed whereupon the tool carrier is again actuated toward the work-piece.

In order to control the rate of movement of the time piston 255 the pipe or conduit 251 is provided with a needle valve adjustable to control the bleed or flow through the pipe, which valve is indicated in general in Fig. 20 by the reference character 271. The needle valve 271 is shown structurally in Fig. 12 as a screw 272 having a pointed end 273 and threaded in a boss 274. The outer end of the screw 272 is notched and projects beyond the forward face of the head housing 68 and the said screw is further provided with a lock nut 275 for securing same in adjusted positions.

As shown in Fig. 12, the needle valve is illustrated as controlling the discharge through a port in the valve block leading from the sleeve radial ports 244 and bleeding into a port 276 which in turn empties into the interior of the head housing.

From the foregoing it will be noted that there has been provided a mechanism whereby a tool carrier is automatically-hydraulically reversed after it has completed a part of its intended working stroke, whereupon the parts are again reversed to pass through this stroke. This structure would result in the drill slowly feeding through the space through which it previously passed and before it could again commence to effect a stock removal from the work, the tool carrier would be reversed. It is therefore necessary to provide a slightly modified control structure which will permit the tool carrier to move at a rapid rate through the distance previously tooled and at the end of this movement to again effect a stock removal from the work. This mechanism is illustrated in Fig. 14 et seq. showing a slight rearrangement of certain of the control parts as well as mechanism for resetting the rapid traverse dog at the conclusion of each work-piece. This mechanism comprises a bracket 277 secured to one side of the head housing and providing at its upper end a bearing 278 in which is rotatably journaled an oscillatable rod 279. The lower end of the rod 279 is oscillatably journaled in a second bearing 280 integral with and projecting from a modified cover plate 281. Secured to the rod 279 at an adjustable point determined by the depth of cut or thickness of the work-piece is a collar 282. Disposed in the carrier slot 117 behind the rod 279 is the rapid traverse dog 283 secured in such a manner as to slide relative thereto as the carrier is being fed into the work. As shown in Fig. 23 the dog 283 is provided in its forward face with a recess 283a and/or having a lug 283b projecting from its rear surface into the slot 117. The lug 283b is provided with an aperture through which extends a stud 283c having the opposite ends thereof threaded. The rear end of the stud receives on its threads a nut 283d and on the threads at its forward end receives a second nut 283e. The nut 283e is disposed in the dog recess 283a and has beneath it a rubber washer 283f which contacts the base of the recess 283a. The dog 283 is frictionally held by the compression of the rubber washer 283f. This frictional clamping of the dog is insufficient to restrain the movement of the carrier but is sufficient to throw the valve flipper member 124.

The flipper 124 has projecting therefrom a lug 284 received in a notch 285 formed in a block 286 from which depends a stem 287. The stem 287 is slidably disposed in a guide sleeve 288 carried by the cover plate 281 and said stem 287 overlies a plunger 289 yieldably actuated by a spring 290 in one direction relative to a bearing sleeve 291 integral with a slide 292. The slide 292 is in turn disposed for axial movement relative to a carrier 293 integral with or secured to the cover plate 281. The plunger 289 is in turn disposed above an oscillatable lever or finger 294 which, as will be seen from Fig. 14, may be oscillated about a pivot screw 295 to dispose a projection 296 thereon beneath the plunger 289. This finger 294 is yieldably actuated by the spring-pressed plunger 297 disposed in a block 298 in the carrier. The slide 292 is provided substantially midway of its length with a slot 299 receiving the ball end 300 of an arm 301 depending from the hub 302 of the manually actuable lever 107. In addition, see Fig. 17, the slide 292 has near its one end a notch 303 receiving the ball end 304 projecting from collar 305 secured to the rod 279 at a point below the bearing 280. In addition the rod 279 carries near its upper end a detent plate 306 having formed therein a pair of notches 307 cooperating with spring-pressed detent pawl 308 carried by the bracket 277.

The operation of these parts is as follows:

The collar 282 is positioned at the desired point on the rod 279 and the final dog 228 is also positioned at the proper point depending upon the thickness of the work or the depth to which it is desired to operate and the rapid traverse dog 283 lies positioned at the proper point to provide the initial amount of rapid traverse movement to be given the carrier. The manual lever 107 is then thrown to the rapid advance position for operating the starting valve mechanism as above described for initiating the downward or forward movement of the tool carrier. This movement of the lever in addition to shifting the starting valve member shifts the slide 292 to the position shown in the drawings thereby oscillating the rod 279 and parts carried thereby to retract the point or end 309 of the collar 282 from the path of movement of the rapid traverse dog 283. The tool carrier and parts carried thereby now descend until the time mechanism effects a reverse thereof, whereupon the tool carrier is actuated upwardly at a rapid traverse rate. As soon as the tool carrier is fully retracted the finger 294 engages and upwardly urges the spring pressed plunger 289 which in turn engages the stem 287 for shifting the block 286 upwardly and actuating the valve flipper member 124 to a downward feeding position. This movement of the flipper member 124 effects a corresponding movement of the lever hub 302 and therefore the arm 301 but due to the loss of motion between the said lever end 300 and walls of the slot 299 no movement of the slide 292 takes place. The carrier is now actuated at a rapid rate toward the work-piece. The carrier continues to move at this rate until it again reaches the point it was prior to the previous reversal, since the rapid traverse dog was shifted upwardly relative to the carrier during the preceding feeding stroke. During this rapid movement of the carrier the time mechanism was again re-set and as soon as the rapid traverse dog shifts the parts to a feeding position the time cylinder comes into play to control the length of time the tool is permitted to operate before the carrier is again reversed. This repeated cycle of movement continues until the work is completely finished or tooled, whereupon the dog screw 230 acts on the block 286 to shift the slide 292 to the reverse position thereby oscillating the rod 279 to a position for interposing the corner 309 of the collar 282 in the path of movement of the rapid traverse dog 283 and arresting said dog in its upward movement when same reaches its initial point of adjustment. At this time when the carrier reaches the upper limit of its movement it is held in this position until it is again manually started on its downward stroke due to the manual actuation of the lever 107. This arrangement is effected because upon the shifting of the slide 292 the intermediate or spring plunger was shifted out of the path of the finger 294 and therefore the finger 294 was unable to effect a reversal in the circuit through the valve operating parts.

As will be appreciated, in deep hole drilling or the like considerable thrust may be developed on the drill due to the length of said drill being encased in the material operated upon, which thrust may reach the point of twisting or breaking the drill. To overcome this the overload spring 220 is somewhat released by backing up the guide sleeve 219 to a point where the back pressure acting on the piston 216 will be such as to be just above the normal cutting pressure. From this it will be seen that the drill or other tool may be withdrawn from the work as soon as the torque or thrust thereon reaches an unsafe point thereby materially increasing and prolonging the life of drills, tools, and the like which are hydraulically fed relative to work-pieces.

In Fig. 21 there is diagrammatically illustrated two general purpose machines each embodying the same mechanism illustrated in Fig. 19 and described in detail above. As will be seen in Fig. 19, a single pump 80 is employed for supplying both the rapid traverse and feed pressure. In a multiple spindle machine the occasion may arise when one of said spindles is to be rapidly advanced or retracted while the other is feeding and this may result in a loss of power to one or the other of the said machines thereby materially decreasing the efficiency thereof. In order to overcome this difficulty it is proposed to provide two pumps, one connected with the feed mechanism and indicated by the reference character 80 in Fig. 21, and a second pump 80' for supplying the rapid traverse and valve actuating fluid. In this way there is no reduction of power to the spindle which is actually cutting or working while other spindles may be actuated at a rapid traverse rate.

Fig. 22 illustrates the same conditions as Fig. 21 with the additional mechanism involved in the stage drilling attachment and in which case the power for actuating the time control mechanism is also taken from the rapid traverse pump 80'.

From the foregoing it is believed now evident that there has been provided a machine tool control mechanism which will accomplish the objects initially set forth above, and it will be noted that the machine performs all of the necessary and desirable functions for a machine of its type. It should also be noted that while the various ports of the different valves are described as connected to one another by pipes or conduits which in actual practice are really ports interdrilled in the various valve blocks carrying the different valves and their operation mechanism except, of course, the pipes or conduits which extend from the pump and valve blocks.

What is claimed is:

1. In a machine tool, the combination of a tool carrier, hydraulic means for advancing and retracting said carrier, and a control mechanism for said hydraulic means including a control valve, a starting valve for said control valve and operable for directly connecting a hydraulic pressure source therewith for shifting the same to effect the operation of the carrier at a rapid rate in a given direction, means associated and movable with said carrier for shifting the starting valve to relieve the hydraulic pressure on the control valve, spring means for shifting the control valve upon release of the pressure thereon to a position to effect continued movement of the carrier but at a slow rate of speed, latch means limiting the movement of the control valve by the spring means, and means operable for releasing the latch and effecting a further shifting of the control valve to effect a reverse movement of the carrier at a rapid rate.

2. In a machine tool, the combination of a tool carrier, hydraulic means for advancing and retracting said carrier, and a control mechanism for said hydraulic means including a control valve, a starting valve for said control valve and operable for directly connecting a hydraulic pressure source therewith for shifting the same to effect the operation of the carrier at a rapid rate in a given direction, means associated and movable with said carrier for shifting the starting valve to relieve the hydraulic pressure on the control valve, spring means for shifting the control valve upon release of the pressure thereon to a position to effect continued movement of the carrier but at a slow rate of speed, latch means limiting the movement of the control valve by the spring means, and means operable for releasing the latch and effecting a further shifting of the control valve to effect a reverse movement of the carrier at a rapid rate, said latch releasing means including a hydraulic piston connected with the forward or feeding side of the tool carrier actuating means and operable upon building up of pressure on said forward side of the carrier feeding means.

3. In a machine tool, the combination of a tool carrier, hydraulic means for advancing and retracting said carrier, and a control mechanism for said hydraulic means including a control valve, a starting valve for said control valve and operable for directly connecting a hydraulic pressure source therewith for shifting the same to effect the operation of the carrier at a rapid rate in a given direction, means associated and movable with said carrier for shifting the starting valve to relieve the hydraulic pressure on the control valve, spring means for shifting the control valve upon release of the pressure thereon to a position to effect continued movement of the carrier but at a slow rate of speed, latch means limiting the movement of the control valve by the spring means, means operable for releasing the latch and effecting a further shifting of the control valve to effect a reverse movement of the carrier at a rapid rate, said latch releasing means including a hydraulic piston connected with the forward or feeding side of the tool carrier actuating means and operable upon building up of pressure on said forward side of the carrier feeding means, and dog means for stopping the movement of the carrier at the conclusion of the working stroke to thereby cause a building up of pressure on the forward or feeding side of the carrier actuating means and effect the operation of the latch releasing piston.

4. In a machine tool, the combination of a support, a tool head secured to said support and having formed therein a dove-tail guide-way, a tool carrier having a guiding tongue projecting therefrom into the dove-tail guide-way of the tool head, a hydraulic piston and cylinder mechanism connected with said carrier for effecting its reciprocation, and control means for said piston and cylinder mechanism including a control valve, a starting valve manually operable to a position for connecting a hydraulic pressure source with the control valve for shifting the same to cause a forward movement of the piston at a rapid rate, co-operating means on said carrier and associated with said starting valve and including a dog on the carrier for shifting said starting valve to a position for relieving the pressure on the control valve, spring means associated with the control valve for shifting same upon release of the hydraulic pressure thereon to a position to cause the continued forward movement of the piston and cylinder mechanism but at a slow feeding rate, a pivoted latch for limiting the movement of the control valve by the spring means, and means for rendering the latch inoperative and effecting the further shifting of the control valve by the spring means including co-operating stop dog means associated with the carrier and an abutment associated with the tool head for building up a pressure on the latch and releasably actuating same.

5. In a machine tool, the combination of a support, a tool head secured to said support and having formed therein a dove-tail guide-way, a tool carrier having a guiding tongue projecting therefrom into the dove-tail guide-way of the tool head, a hydraulic piston and cylinder mechanism connected with said carrier for effecting its reciprocation, and control means for said piston and cylinder mechanism including a control valve, a starting valve manually operable to a position for connecting a hydraulic pressure source with the control valve for shifting the same to cause a forward movement of the piston at a rapid rate, co-operating means on said carrier and associated with said starting valve and including a dog on the carrier for shifting said starting valve to a position for relieving the pressure on the control valve, spring means associated with the control valve for shifting same upon release of the hydraulic pressure thereon to a position to cause the continued forward movement of the piston and cylinder mechanism but at a slow feeding rate, a pivoted latch for limiting the movement of the control valve by the spring means, and means for rendering the latch inoperative and effecting the further shifting of the control valve by the spring means including co-operating stop dog means associated with the carrier and an abutment associated with the tool head for building up a pressure on the latch and releasably actuating same, said dog means on the carrier being adjustably secured thereto whereby different distances may be established between it and the tool head abutment and an abutment screw adjustably carried by said dog to effect minute adjustment of this distance between the stop dog and its abutment.

6. In a machine tool, the combination of a tool carrier, a hydraulic piston and cylinder mechanism having one of said parts stationary and the other movable and connected with the carrier, a hydraulic circuit for actuating said movable part and thereby the tool carrier, including a control valve, a starting valve for the control valve and operable to a position for directly connecting a hydraulic pressure source therewith to shift said control valve to cause a forward movement of the tool carrier at a rapid rate, an actuator associated with the starting valve, means associated with the carrier and movable therewith for shifting the actuator to position the control valve for relieving the pressure on the control valve, spring means for shifting the control valve to a position upon relief of the hydraulic pressure thereon to cause the forward movement of the carrier at a reduced rate, latch means for holding the control valve in its slow speed position, and a hydraulic timing device operable for rendering the latch inoperative after a predetermined time interval to effect the further shifting of the control valve and cause a retraction of the carrier at a rapid rate.

7. In a machine tool, the combination of a tool carrier, a hydraulic piston and cylinder mechanism having one of said parts stationary and the other movable and connected with the carrier, a hydraulic circuit for actuating said movable part and thereby the tool carrier, including a control valve, a starting valve for the control valve and operable to a position for directly connecting a hydraulic pressure source therewith to shift said control valve to cause a forward movement of the tool carrier at a rapid rate, an actuator associated with the starting valve, means associated with the carrier and movable therewith for shifting the actuator to position the control valve for relieving the pressure on the control valve, spring means for shifting the control valve to a position upon relief of the hydraulic pressure thereon to cause the forward movement of the carrier at a reduced rate, latch means for holding the control valve in its slow speed position, a hydraulic timing device operable for rendering the latch inoperative after a predetermined time interval to effect the further shifting of the control valve and cause a retraction of the carrier at a rapid rate, and additional hydraulically operated means connected with the forward side of the carrier actuating part for rendering the latch means inoperative and operable upon a build-up of pressure on said forward side of the carrier actuating part to effect the further shifting of the control valve to cause the retraction of the carrier at a rapid rate.

8. In a machine tool, the combination of a tool carrier, a hydraulic piston and cylinder mechanism having one of said parts stationary and the other movable and connected with the carrier, a hydraulic circuit for actuating said movable part and thereby the tool carrier, including a control valve, a starting valve for the control valve and operable to a position for directly connecting a hydraulic pressure source therewith to shift said control valve to cause a forward movement of the tool carrier at a rapid rate, an actuator associated with the starting valve, means associated with the carrier and movable therewith for shifting the actuator to position the control valve for relieving the pressure on the control valve, spring means for shifting the control valve to a position upon relief of the hydraulic pressure thereon to cause the forward movement of the carrier at a reduced rate, latch means for holding the control valve in its slow speed position, a hydraulic timing device operable for rendering the latch inoperative after a predetermined time interval to effect the further shifting of the control valve and cause a retraction of the carrier at a rapid rate, and additional hydraulically operated means connected with the forward side of the carrier actuating part for rendering the latch means inoperative and operable upon a build up of pressure on said forward side of the carrier actuating part to effect the further shifting of the control valve to cause the retraction of the carrier at a rapid rate, said last mentioned hydraulic latch releasing means including spring loaded piston acting against the pressure thereon, and means for varying the tension of the spring comprising a sleeve nut which forms one abutment for the spring and means for rotating the same.

9. In a machine tool, the combination of a tool carrier, a tool head for supporting said carrier, a hydraulic piston and cylinder mechanism having one of said parts stationary and the other movable and connected with the carrier, a hydraulic circuit for actuating said movable part and thereby the carrier, including a control valve, a starting valve for the control valve and operable to a position for directly connecting a hydraulic pressure source therewith to shift said control valve to cause a forward movement of the tool carrier at a rapid rate, an actuator associated with the starting valve, means associated with the carrier and movable therewith for shifting the actuator to position the control valve for relieving the pressure on the control valve, spring means for shifting the control valve to a position upon relief of the hydraulic pressure thereon to cause the forward movement of the carrier at a reduced rate, latch means for holding the control valve in its slow speed position, a hydraulic timing device operable for rendering the latch inoperative after a predetermined time interval to effect the further shifting of the control valve and cause a retraction of the carrier at a rapid rate, and means associated with the carrier and head for shifting said starting valve to a position for again connecting the hydraulic pressure with the control valve to cause a further forward movement of the carrier at a rapid rate.

10. In a deep hole drilling machine of the class described, the combination of a tool carrier, a support for the tool carrier, a piston and cylinder mechanism, one of which parts is fixed and the other movable and connected with the carrier, hydraulic means for actuating the said movable part and thereby the carrier, and control means for said hydraulic actuating means for effecting a plurality of cyclic movements of the carrier including a control valve, a starting valve therefor and operable to a position for directly connecting a hydraulic pressure source with the control valve to shift same to a first position and effect a rapid forward movement of the carrier from an initial starting point, an actuator associated with the starting valve whereby it is operated, a dog frictionally mounted on the carrier for operating the actuator to shift the starting valve to a position for relieving the pressure on the control valve, means for shifting the control valve to a second position to cause the tool carrier to move at a slow rate of speed, a latch for holding the control valve in its second position, means operable after a pre-determined time interval from the initial actuation of the carrier for releasing the latch and effecting the shifting of the control valve to a third position to cause a retracting rapid movement of the carrier, and co-operating means carried by the carrier and support for operating the starting valve actuator to shift said control valve to a position connecting the hydraulic pressure source with the control valve for shifting this valve to its first position and for again advancing the carrier at a rapid rate from a point ahead of the initial starting point.

11. In a deep hole drilling machine of the class described, the combination of a tool carrier, a support for the tool carrier, a piston and cylinder mechanism, one of which parts is fixed with the carrier, other movable and connected with the carrier, hydraulic means for actuating the said movable part and thereby the carrier, and control means for said hydraulic actuating means for effecting a plurality of cyclic movements of the carrier including a control valve, a starting valve therefor and operable to a position for directly connecting a hydraulic pressure source with the control valve to shift same to a first position and effect a rapid forward movement of the carrier from an initial starting point, an actuator associated with the starting valve whereby it is operated, a dog frictionally mounted on the carrier for operating the actuator to shift the starting valve to a position for relieving the pressure on the control valve, means for shifting the control valve to a second position to cause the tool carrier to move at a slow rate of speed, a latch for holding the control valve in its second position, means operable after a predetermined time interval from the initial actuation of the carrier for releasing the latch and effecting the shifting of the control valve to a third position to cause a retracting rapid movement of the carrier, and co-operating means carried by the carrier and support for operating the starting valve actuator to shift said control valve to a position connecting the hydraulic pressure source with the control valve for shifting this valve to its first position and for again advancing the carrier at a rapid rate from a point ahead of the initial starting point, said frictionally mounted dog on the carrier being held against movement with the carrier after shifting the valve actuator to limit the forward movement of the carrier but movable therewith during the retracting movement of the carrier and operable on successive advancing movements of the carrier to change its rate from rapid to slow at substantially the point where the previous reversal took place.

12. In a deep hole drilling machine of the class described, the combination of a tool carrier, a support for the tool carrier, a piston and cylinder mechanism, one of which parts is fixed and the other movable and connected with the carrier, hydraulic means for actuating the said movable part and thereby the carrier, and control means for said hydraulic actuating means for effecting a plurality of cyclic movements of the carrier including a control valve, a starting valve therefor and operable to a position for directly connecting a hydraulic pressure source with the control valve to shift same to a first position and effect a rapid forward movement of the carrier from an initial starting point, an actuator associated with the starting valve whereby it is operated, a dog frictionally mounted on the carrier for operating the actuator to shift the starting valve to a position for relieving the pressure on the control valve, means for shifting the control valve to a second position to cause the tool carrier to move at a slow rate of speed, a latch for holding the control valve in its second position, means operable after a predetermined time interval from the initial actuation of the carrier for releasing the latch and effecting the shifting of the control valve to a third position to cause a retracting rapid movement of the carrier, and co-operating means carried by the carrier and support for operating the starting valve actuator to shift said control valve to a position connecting the hydraulic pressure source with the control valve for shifting this valve to its first position and for again advancing the carrier at a rapid rate from a point ahead of the initial starting point, said frictionally mounted dog on the carrier being held against movement with the carrier after shifting the valve actuator to limit the forward movement of the carrier but movable therewith during the retracting movement of the carrier and operable on successive advancing movements of the carrier to change its rate from rapid to slow at substantially the point where the previous reversal took place, and a hydraulically actuated piston connected with the forward side of the piston and cylinder mechanism for rendering the latch means inoperative prior to the actuation thereof by the timing mechanism in the event of a build up of pressure on the forward side of the piston and cylinder mechanism.

13. In a deep hole drilling machine of the class described, the combination of a tool carrier, a support for the tool carrier, a piston and cylinder mechanism, one of which parts is fixed and the other movable and connected with the carrier, hydraulic means for actuating the said movable part and thereby the carrier, and control means for said hydraulic actuating means for effecting a plurality of cyclic movements of the carrier including a control valve, a starting valve therefor and operable to a position for directly connecting a hydraulic pressure source with the control valve to shift same to a first position and effect a rapid forward movement of the carrier from an initial starting point, an actuator associated with the starting valve whereby it is operated, a dog frictionally mounted on the carrier for operating the actuator to shift the starting valve to a position for relieving the pressure on the control valve, means for shifting the control valve to a second position to cause the tool carrier to move at a slow rate of speed, a latch for holding the control valve in its second position, means operable after a predetermined time interval from the initial actuation of the carrier for releasing the latch and effecting the shifting of the control valve to a third position to cause a retracting rapid movement of the carrier, and co-operating means carried by the carrier and support for operating the starting valve actuator to shift said starting valve to a position connecting the hydraulic pressure source with the control valve for shifting this valve to its first position and for again advancing the carrier at a rapid rate from a point ahead of the initial starting point, said frictionally mounted dog on the carrier being held against movement with the carrier after shifting the valve actuator to limit the forward movement of the carrier but movable therewith during the retracting movement of the carrier and operable on successive advancing movements of the carrier to change its rate from rapid to slow at substantially the point where the previous reversal took place, a hydraulically actuated piston connected with the forward side of the piston and cylinder mechanism for rendering the latch means inoperative prior to the actuation thereof by the timing mechanism in the event of a build up of pressure on the forward side of the piston and cylinder mechanism, and means for adjusting the point at which the build up pressure becomes operative for actuating the latch.

14. In a deep hole drilling machine, the combination of a tool carrier, a support therefor, a piston and cylinder mechanism one of which parts is fixed while the other is movable and connected with the carrier, hydraulic means for actuating said movable part and therefore the carrier, and control means for effecting a plurality of cyclic movements of the carrier from an initial starting point and an intermediate point including a control valve, a starting valve for directly connecting a hydraulic pressure source with the control valve to cause a rapid advance movement of the carrier, spring means for shifting said control valve to a first position for advancing the carrier at a slow rate and to a second position for retracting the carrier at a rapid rate, an actuator associated with the starting valve for actuating same, slip dog means on the carrier for operating the actuator in one direction, co-operating means on the carrier and support for operating the actuator in the other direction from the intermediate point, latch means for limiting the operation of the control valve by the spring means at the point for advancing the carrier at a slow rate, and a hydraulically actuated timing device for releasing the latch to effect the shifting of the control valve at a predetermined time interval after the slow forward movement of the carrier.

15. In a deep hole drilling machine, the combination of a tool carrier, a support therefor, a piston and cylinder mechanism one of which parts is fixed while the other is movable and connected with the carrier, hydraulic means for actuating said movable part and therefore the carrier, and control means for effecting a plurality of cyclic movements of the carrier from an initial starting point and an intermediate point including a control valve, a starting valve for directly connecting a hydraulic pressure source with the control valve to cause a rapid advance movement of the carrier, spring means for shifting said control valve to a first position for advancing the carrier at a slow rate and to a second position for retracting the carrier at a rapid rate, an actuator associated with the starting valve for actuating same, slip dog means on the carrier for operating the actuator in one direction, co-operating means on the carrier and support for operating the actuator in the other direction from the intermediate point, latch means for limiting the operation of the control valve by the spring means at the point for advancing the carrier at a slow rate, a hydraulically actuated timing device for releasing the latch to effect the shifting of the control valve at a predetermined time interval after the slow forward movement of the carrier, and a hydraulic overload mechanism including a piston connected with the forward side of the piston and cylinder mechanism for releasing the latch prior to the release thereof by the hydraulic time mechanism in the event of an overload on said forward side of the piston and cylinder.

16. In a deep hole drilling machine, the combination of a tool carrier, a support therefor, a piston and cylinder mechanism one of which parts is fixed while the other is movable and connected with the carrier, hydraulic means for actuating said movable part and therefore the carrier, and control means for effecting a plurality of cyclic movements of the carrier from an initial starting point and an intermediate point including a control valve, a starting valve for directly connecting a hydraulic pressure source with the control valve to cause a rapid advance movement of the carrier, spring means for shifting said control valve to a first position for advancing the carrier at a slow rate and to a second position for retracting the carrier at a rapid rate, an actuator associated with the starting valve for actuating same, slip dog means on the carrier for operating the actuator in one direction, co-operating means on the carrier and support for operating the actuator in the other direction from the intermediate point, latch means for limiting the operation of the control valve by the spring means at the point for advancing the carrier at a slow rate, a hydraulically actuated timing device for releasing the latch to effect the shifting of the control valve at a predetermined time interval after the slow forward movement of the carrier, a hydraulic overload mechanism including a piston connected with the forward side of the piston and cylinder mechanism for releasing the latch prior to the release thereof by the hydraulic time mechanism in the event of an overload on said forward side of the piston and cylinder, and additional means on the carrier for operating the starting valve actuator after the completion of the tooling of each work piece for retracting the carrier.

17. In a deep hole drilling machine, the combination of a tool carrier, a support therefor, a piston and cylinder mechanism one of which parts is fixed while the other is movable and connected with the carrier, hydraulic means for actuating said movable part and therefore the carrier, and control means for effecting a plurality of cyclic movements of the carrier from an initial starting point and an intermediate point including a control valve, a starting valve for directly connecting a hydraulic pressure source with the control valve to cause a rapid advance movement of the carrier, spring means for shifting said control valve to a first position for advancing the carrier at a slow rate and to a second position for retracting the carrier at a rapid rate, an actuator associated with the starting valve for actuating same, slip dog means on the carrier for operating the actuator in one direction, co-operating means on the carrier and support for operating the actuator in the other direction from the intermediate point, latch means for limiting the operation of the control valve by the spring means at the point for advancing the carrier at a slow rate, a hydraulically actuated timing device for releasing the latch to effect the shifting of the control valve at a predetermined time interval after the slow forward movement of the carrier, a hydraulic overload mechanism including a piston connected with the forward side of the piston and cylinder mechanism for releasing the latch prior to the release thereof by the hydraulic time mechanism in the event of an overload on said forward side of the piston and cylinder, additional means on the carrier for operating the starting valve actuator after the completion of the tooling of each work piece for retracting the carrier, and means operable by the last named means for rendering inoperable the starting valve actuator operating means normally operable from the intermediate point and to effect a retracting of the carrier to its initial position.

18. In a deep hole drilling machine, a tool carrier, a support, a piston and cylinder mechanism one of which parts is fixed and the other movable and connected with the carrier, hydraulic means for actuating said movable part and therefore the tool carrier, and control means for said hydraulic actuating means including a control valve, a starting valve therefor, means for actuating said valve for directly connecting hydraulic pressure with the control valve for initiating the forward rapid movement of the carrier from a fully retracted position, means for shifting said starting valve for directly connecting the hydraulic pressure source with the control valve for actuating the carrier from a point ahead of its initial starting point, a slip dog for shifting the starting valve to a position for relieving the hydraulic pressure on the control valve to actuate the carrier at a slow rate in a forward direction, the means frictionally mounting said slip dog on the carrier, means for holding the slip dog against movement relative to the carrier while advancing at a slow rate and thereby automatically positioning the slip dog for operation during successive movements of the carrier at the point where the previous reversal took place, and a hydraulic timing mechanism for limiting the amount of slow forward movement of the carrier during each cycle.

19. In a deep hole drilling machine, a tool carrier, a support, a piston and cylinder mechanism one of which parts is fixed and the other movable and connected with the carrier, hydraulic means for actuating said movable part and therefore the tool carrier, and control means for said hydraulic actuating means including a control valve, a starting valve therefor, means for actuating said valve for directly connecting hydraulic pressure with the control valve for initiating the forward rapid movement of the carrier from a fully retracted position, means for shifting said starting valve for directly connecting the hydraulic pressure source with the control valve for actuating the carrier from a point ahead of its initial starting point, a slip dog for shifting the starting valve to a position for relieving the hydraulic pressure on the control valve to actuate the carrier at a slow rate in a forward direction, means frictionally mounting said slip dog on the carrier, means for holding the slip dog against movement relative to the carrier while advancing at a slow rate and thereby automatically positioning the slip dog for operation during successive movements of the carrier at a point where the previous reversal took place, a hydraulic timing mechanism for limiting the amount of slow forward movement of the carrier during each cycle, an actuator for the starting valve, and means operable on the starting valve actuator at the conclusion of a tooling operation of each work piece for retracting the carrier to its initial fully retracted position.

20. In a deep hole drilling machine, a tool carrier, a support, a piston and cylinder mechanism one of which parts is fixed and the other movable and connected with the carrier, hydraulic means for actuating said movable part and therefore the tool carrier, and control means for said hydraulic actuating means including a control valve, a starting valve therefor, means for actuating said valve for directly connecting hydraulic pressure with the control valve for initiating the forward rapid movement of the carrier from a fully retracted position, means for shifting said starting valve for directly connecting the hydraulic pressure source with the control valve for actuating the carrier from a point ahead of its initial starting point, a slip dog for shifting the starting valve to a position for relieving the hydraulic pressure on the control valve to actuate the carrier at a slow rate in a forward direction, means frictionally mounting said slip dog on the carrier, means for holding the slip dog against movement relative to the carrier while advancing at a slow rate and thereby automatically positioning the slip dog for operation during successive movements of the carrier at the point where the previous reversal took place, a hydraulic timing mechanism for limiting the amount of slow forward movement of the carrier during each cycle, an actuator for the starting valve, means operable on the starting valve actuator at the conclusion of a tooling operation of each work piece for retracting the carrier to its fully initial retracted position, and means operable by the final retracting means for rendering the starting valve shifting means inoperative.

21. In a deep hole drilling machine, a tool carrier, a support, a piston and cylinder mechanism one of which parts is fixed and the other movable and connected with the carrier, hydraulic means for actuating said movable part and therefore the tool carrier, and control means for said hydraulic actuating means including a control valve, a starting valve therefor, means for actuating said valve for directly connecting hydraulic pressure with the control valve for initiating the forward rapid movement of the carrier from a fully retracted position, means for shifting said starting valve for directly connecting the hydraulic pressure source with the control valve for actuating the carrier from a point ahead of its initial starting point, a slip dog for shifting the starting valve to a position for relieving the hydraulic pressure on the control valve to actuate the carrier at a slow rate in a forward direction, means frictionally mounting said slip dog on the carrier, means for holding the slip dog against movement relative to the carrier while advancing at a slow rate and thereby automatically positioning the slip dog for operation during successive movements of the carrier at the point where the previous reversal took place, a hydraulic timing mechanism for limiting the amount of slow forward movement of the carrier during each cycle, an actuator for the starting valve, means operable on the starting valve actuator at the conclusion of a tooling operation of each work piece for retracting the carrier to its fully initial retracted position, means operable by the final retracting means for rendering the starting valve shifting means inoperative, and means operable through the last mentioned means for positioning the slip dog at its initial position for a repetition of the cycle of operation.

22. In a machine tool, the combination of a tool carrier, hydraulic means for advancing and retracting said carrier, and a control mechanism for said hydraulic means including a control valve, a starting valve for said control valve and operable for directly connecting a hydraulic source therewith for shifting the same to effect the operation of the carrier at a rapid rate in a given direction, means associated and movable with said carrier for shifting the starting valve to relieve the hydraulic pressure on the control valve, means for controlling the flow of the pressure source to establish a slow rate of movement of the tool carrier, spring means for shifting the control valve upon release of the pressure thereon to a position for connecting the pressure source with the slow rate means to effect continued movement of the carrier but at a slow rate of speed, latch means limiting the movement of the control valve by the spring means, and means operable for releasing the latch and effecting a further shifting of the control valve to effect a reverse movement of the carrier at a rapid rate, including a hydraulic piston connected with the forward or feeding side of the tool carrier actuating means and operable upon building up of pressure on said forward side of the carrier feeding means.

23. In a machine tool, the combination of a tool carrier, hydraulic means for advancing and retracting said carrier, and a control mechanism for said hydraulic means including a control valve, a starting valve for said control valve and operable for directly connecting a hydraulic source therewith for shifting the same to effect the operation of the carrier at a rapid rate in a given direction, means associated and movable with said carrier for shifting the starting valve to relieve the hydraulic pressure on the starting valve, means for controlling the flow of the pressure source to establish a slow rate of movement of the tool carrier, spring means for shifting the control valve upon release of the pressure thereon to a position for connecting the pressure source with the slow rate means to effect continued movement of the carrier but at a slow rate of speed, latch means limiting the movement of the control valve by the spring means, means operable for releasing the latch and effecting a further shifting of the control valve to effect a reverse movement of the carrier at a rapid rate, including a hydraulic piston connected with the forward or feeding side of the tool carrier actuating means and operable upon building up of pressure on said forward side of the carried feeding means, and means for adjusting the slow rate means and thereby varying the rate of slow movement of the tool carrier.

24. In a machine tool, the combination of a tool carrier, hydraulic means for advancing and retracting said carrier, and a control mechanism for said hydraulic means including a control valve, a starting valve for said control valve and operable for directly connecting a hydraulic source therewith for shifting the same to effect the operation of the carrier at a rapid rate in a given direction, means associated and movable with said carrier for shifting the starting valve to relieve the hydraulic pressure on the starting valve, means for controlling the flow of the pressure source to establish a slow rate of movement of the tool carrier, spring means for shifting the control valve upon release of the pressure thereon to a position for connecting the pressure source with the slow rate means to effect continued movement of the carrier but at a slow rate of speed, latch means limiting the movement of the control valve by the spring means, means operable for releasing the latch and effecting a further shifting of the control valve to effect a reverse movement of the carrier at a rapid rate, including a hydraulic piston connected with the forward or feeding side of the tool carrier actuating means and operable upon building up of pressure on said forward side of the carrier feeding means, and means including a balance valve associated with the slow rate means for maintaining a constant slow rate movement of the carrier actuating means.

25. In a machine tool, the combination of a tool carrier, hydraulic means for advancing and retracting said carrier, and a control mechanism for said hydraulic means including a control valve, a starting valve for said control valve and operable for directly connecting a hydraulic source therewith for shifting the same to effect the operation of the carrier at a rapid rate in a given direction, means associated and movable with said carrier for shifting the starting valve to relieve the hydraulic pressure on the control valve, means for controlling the flow of the pressure source to establish a slow rate of movement of the tool carrier, spring means for shifting the control valve upon release of the pressure thereon to a position for connecting the pressure source with the slow rate means to effect continued movement of the carrier but at a slow rate of speed, latch means limiting the movement of the control valve by the spring means, means operable for releasing the latch and effecting a further shifting of the control valve to effect a reverse movement of the carrier at a rapid rate, including a hydraulic piston connected with the forward or feeding side of the tool carrier actuating means and operable upon building up of pressure on said forward side of the carrier feeding means, means for adjusting the slow rate means and thereby varying the rate of slow movement of the tool carrier, and means including a balance valve associated with the slow rate means for maintaining a constant slow rate movement of the carrier actuating means.

26. In a deep hole drilling machine, the combination of a tool carrier, a support for the tool carrier, a piston and cylinder mechanism, one of which is fixed and the other movable and connected with the carrier, hydraulic means for actuating said movable part and thereby the carrier, and control means for said hydraulic actuating means for effecting a plurality of cyclic movements of the carrier, including a control valve, a starting valve therefor and operable to a position for directly connecting a hydraulic pressure source with the control valve to shift same to a first position and effect a rapid forward movement of the carrier from an initial starting point, an actuator associated with the starting valve whereby it is operated, a dog frictionally mounted on the carrier for operating the actuator to shift the starting valve to a position for relieving the pressure on the control valve, means for controlling the flow of the hydraulic means to effect the movement of the movable part and carrier at a slow rate, means for shifting the control valve to a second position and connecting the hydraulic means with the slow rate means to cause the tool carrier to move at a slow rate of speed, a latch for holding the control valve in its second position, means operable after a predetermined time interval from the initial actuation of the carrier for releasing the latch and effecting the shifting of the control valve to a third position to cause a retracting rapid movement of the carrier, and co-operating means carried by the carrier and support for operating the starting valve actuator to shift said starting valve to a position connecting the hydraulic pressure source with the control valve for shifting this valve to its first position and for again advancing the carrier at a rapid rate from a point ahead of the initial starting point.

27. In a deep hole drilling machine, the combination of a tool carrier, a support for the tool carrier, a piston and cylinder mechanism, one of which is fixed and the other movable and connected with the carrier, hydraulic means for actuating said movable part and thereby the carrier, and control means for said hydraulic actuating means for effecting a plurality of cyclic movements of the carrier, including a control valve, a starting valve therefor and operable to a position for directly connecting a hydraulic pressure source with the control valve to shift same to a first position and effect a rapid forward movement of the carrier from an initial starting point, an actuator associated with the starting valve whereby it is operated, a dog frictionally mounted on the carrier for operating the actuator to shift the starting valve to a position for relieving the pressure on the control valve, means for controlling the flow of the hydraulic means to effect the movement of the movable part and carrier at a slow rate, means for shifting the control valve to a second position and connecting the hydraulic means with the slow rate means to cause the tool carrier to move at a slow rate of speed, a latch for holding the control valve in its second position, means operable after a predetermined time interval from the initial actuation of the carrier for releasing the latch and effecting the shifting of the control valve to a third position to cause a retracting rapid movement of the carrier, co-operating means carried by the carrier and support for operating the starting valve actuator to shift said starting valve to a position connecting the hydraulic pressure source with the control valve for shifting this valve to its first position and for again advancing the carrier at a rapid rate from a point ahead of the initial starting point, and means for adjusting the slow rate means and thereby varying the rate of slow movement of the tool carrier.

28. In a deep hole drilling machine, the combination of a tool carrier, a support for the tool carrier, a piston and cylinder mechanism, one of which is fixed and the other movable and connected with the carrier, hydraulic means for actuating said movable part and thereby the carrier, and control means for said hydraulic actuating means for effecting a plurality of cyclic movements of the carrier, including a control valve, a starting valve therefor and operable to a position for directly connecting a hydraulic pressure source with the control valve to shift same to a first position and effect a rapid forward movement of the carrier from an initial starting point, an actuator associated with the starting valve whereby it is operated, a dog frictionally mounted on the carrier for operating the actuator to shift the starting valve to a position for relieving the pressure on the control valve, means for controlling the flow of the hydraulic means to effect the movement of the movable part and carrier at a slow rate, means for shifting the control valve to a second position and connecting the hydraulic means with the slow rate means to cause the tool carrier to move at a slow rate of speed, a latch for holding the control valve in its second position, means operable after a predetermined time interval from the initial actuation of the carrier for releasing the latch and effecting the shifting of the control valve to a third position to cause a retracting rapid movement of the carrier, co-operating means carried by the carrier and support for connecting the hydraulic pressure source with the control valve for shifting this valve to its first position and for again advancing the carrier at a rapid rate from a point ahead of the initial starting point, and means including a balance valve associated with the slow rate means for maintaining a constant slow rate movement of the carrier actuating means.

29. In a deep hole drilling machine, the combination of a tool carrier, a support for the tool carrier, a piston and cylinder mechanism, one of which is fixed and the other movable and connected with the carrier, hydraulic means for actuating said movable part and thereby the carrier, and control means for said hydraulic actuating means for effecting a plurality of cyclic movements of the carrier, including a control valve, a starting valve therefor and operable to a position for directly connecting a hydraulic pressure source with the control valve to shift same to a first position and effect a rapid forward movement of the carrier from an initial starting point, an actuator associated with the starting valve whereby it is operated, a dog frictionally mounted on the carrier for operating the actuator to shift the starting valve to a position for relieving the pressure on the control valve, means for controlling the flow of the hydraulic means to effect the movement of the movable part and carrier at a slow rate, means for shifting the control valve to a second position and connecting the hydraulic means with the slow rate means to cause the tool carrier to move at a slow rate of speed, a latch for holding the control valve in its second position, means operable after a predetermined time interval from the initial actuation of the carrier for releasing the latch and effecting the shifting of the control valve to a third position to cause a retracting rapid movement of the carrier, co-operating means carried by the carrier and support for operating the starting valve actuator to shift said starting valve to a position connecting the hydraulic pressure source with the control valve for shifting this valve to its first position and for again advancing the carrier at a rapid rate from a point ahead of the initial starting point, means for adjusting the slow rate means and thereby varying the rate of slow movement of the tool carrier, and means including a balance valve associated with the slow rate means for maintaining a constant slow rate movement of the carrier actuating means.

GEORGE K. McKEE.
CHARLES E. BERNITT.